United States Patent
Aota

(10) Patent No.: US 9,918,022 B2
(45) Date of Patent: Mar. 13, 2018

(54) IMAGING DEVICE AND IMAGING METHOD

(71) Applicant: OLYMPUS CORPORATION, Hachioji-shi, Tokyo (JP)

(72) Inventor: Koji Aota, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/371,544

(22) Filed: Dec. 7, 2016

(65) Prior Publication Data
US 2017/0171474 A1   Jun. 15, 2017

(30) Foreign Application Priority Data

Dec. 10, 2015   (JP) .................................. 2015-241108

(51) Int. Cl.
*H04N 5/262* (2006.01)
*H04N 5/232* (2006.01)
(Continued)

(52) U.S. Cl.
CPC ........... *H04N 5/2625* (2013.01); *G06T 5/002* (2013.01); *G06T 5/009* (2013.01);
(Continued)

(58) Field of Classification Search
CPC . G06T 2207/10016; G06T 2207/10024; G06T 2207/20182; G06T 2207/20221; G06T 5/002; G06T 5/003; G06T 5/009; G06T 3/4053; H04N 5/23229; H04N 5/2625; H04N 5/378; H04N 5/2355; H04N 5/367; H04N 5/235; H04N 5/23232;
(Continued)

(56) References Cited

U.S. PATENT DOCUMENTS 5,309,243 A * 5/1994 Tsai ..................... H04N 1/4072
348/221.1
6,529,618 B1 * 3/2003 Ohara ................... G06T 11/005
382/132

(Continued)

FOREIGN PATENT DOCUMENTS

JP   2011-135409   7/2011
JP   2013-172372   9/2013

*Primary Examiner* — Michael Osinski
(74) *Attorney, Agent, or Firm* — John C. Pokotylo; Pokotylo Patent Services

(57) ABSTRACT

An imaging device of the present invention comprises a first combination processing circuit that carries out first cumulative combination processing for every pixel of image data that has been generated by the image sensor and image data that has been stored in a memory, and updates pixel data, a second combination processing circuit that carries out second cumulative combination processing for every pixel of image data that has been generated by the image sensor and image data that has been stored in the memory, and updates pixel data, and a controller that determines whether or not level of each pixel data constituting image data is a given threshold level or greater, and in accordance with the result of determination selects to either carry out the first cumulative processing by the first combination processing circuit, or to carry out the second cumulative processing by the second combination processing circuit.

14 Claims, 11 Drawing Sheets

(51) Int. Cl.
*H04N 9/73* (2006.01)
*H04N 5/378* (2011.01)
*G06T 5/00* (2006.01)

(52) U.S. Cl.
CPC ......... *H04N 5/23229* (2013.01); *H04N 5/378* (2013.01); *H04N 9/735* (2013.01); *G06T 2207/10016* (2013.01); *G06T 2207/10024* (2013.01); *G06T 2207/20182* (2013.01); *G06T 2207/20221* (2013.01)

(58) Field of Classification Search
CPC ...... H04N 5/347; H04N 5/2351; H04N 9/735; G06K 9/40; G06K 15/1872
See application file for complete search history.

(56) References Cited

U.S. PATENT DOCUMENTS

| | | | | |
|---|---|---|---|---|
| 7,312,824 | B2* | 12/2007 | Takano | H04N 9/045 348/275 |
| 7,450,167 | B2* | 11/2008 | Wang | H04N 5/367 348/246 |
| 7,643,075 | B2* | 1/2010 | Kurane | H04N 5/235 348/297 |
| 7,834,925 | B2* | 11/2010 | Kim | H04N 9/045 348/251 |
| 8,503,036 | B2* | 8/2013 | Cassidy | G06K 9/40 345/612 |
| 8,564,691 | B2* | 10/2013 | Tsuda | H04N 5/235 348/230.1 |
| 8,699,818 | B2* | 4/2014 | Yamada | H04N 17/00 382/278 |
| 8,717,628 | B1* | 5/2014 | Moss | H04N 1/3871 358/2.1 |
| 8,792,024 | B2* | 7/2014 | Takenaka | A61B 6/00 348/246 |
| 8,988,544 | B2* | 3/2015 | Shinoda | H04N 5/2355 348/220.1 |
| 9,094,628 | B2* | 7/2015 | Williams | H04N 5/37455 |
| 9,105,216 | B2* | 8/2015 | Inuzuka | G09G 3/2003 |
| 9,462,191 | B2* | 10/2016 | Ogasawara | H04N 5/2351 |
| 9,706,131 | B2* | 7/2017 | Kobayashi | H04N 5/2355 |
| 2002/0126209 | A1* | 9/2002 | Yamada | H04N 5/20 348/219.1 |
| 2004/0100565 | A1* | 5/2004 | Chen | G06T 3/4038 348/229.1 |
| 2004/0207734 | A1* | 10/2004 | Horiuchi | H04N 1/4074 348/229.1 |
| 2006/0098112 | A1* | 5/2006 | Kelly | H04N 5/23222 348/333.12 |
| 2006/0170662 | A1* | 8/2006 | Kurane | H04N 5/235 345/204 |
| 2006/0181621 | A1* | 8/2006 | Wang | H04N 5/367 348/246 |
| 2007/0086674 | A1* | 4/2007 | Guan | H04N 5/217 382/275 |
| 2008/0094481 | A1* | 4/2008 | Rai | H04N 5/232 348/222.1 |
| 2009/0279800 | A1* | 11/2009 | Uetani | H04N 19/176 382/238 |
| 2009/0316213 | A1* | 12/2009 | Cassidy | G06K 9/40 358/3.03 |
| 2010/0260417 | A1* | 10/2010 | Dai | G06K 9/00456 382/165 |
| 2012/0044392 | A1* | 2/2012 | Takenaka | A61B 6/00 348/246 |
| 2012/0127545 | A1* | 5/2012 | Hayashi | H04N 1/52 358/515 |
| 2012/0229650 | A1* | 9/2012 | Matthews | G06K 9/6289 348/164 |
| 2013/0010182 | A1* | 1/2013 | Kino | H04N 5/217 348/360 |
| 2013/0044347 | A1* | 2/2013 | Kitai | H04N 1/4092 358/1.14 |
| 2013/0100320 | A1* | 4/2013 | Yamada | H04N 5/367 348/247 |
| 2013/0136364 | A1* | 5/2013 | Kobayashi | G06T 5/009 382/195 |
| 2014/0044366 | A1* | 2/2014 | Yamaguchi | G06T 11/60 382/232 |
| 2014/0064612 | A1* | 3/2014 | Matsumura | G06T 9/00 382/166 |
| 2014/0313367 | A1 | 10/2014 | Iwasaki | |
| 2014/0347519 | A1 | 11/2014 | Yamamoto | |
| 2015/0116564 | A1* | 4/2015 | Williams | H04N 5/37455 348/308 |
| 2016/0217592 | A1* | 7/2016 | Croxford | G06T 11/00 |
| 2017/0024856 | A1* | 1/2017 | Kajimura | G06T 3/40 |
| 2017/0186140 | A1* | 6/2017 | Eguchi | G06T 5/003 |

* cited by examiner

| R | Gr | R | Gr | ... |
| Gb | B | Gb | B | ... |
| R | Gr | R | Gr | ... |
| Gb | B | Gb | B | ... |
| ... | ... | ... | ... | ... |

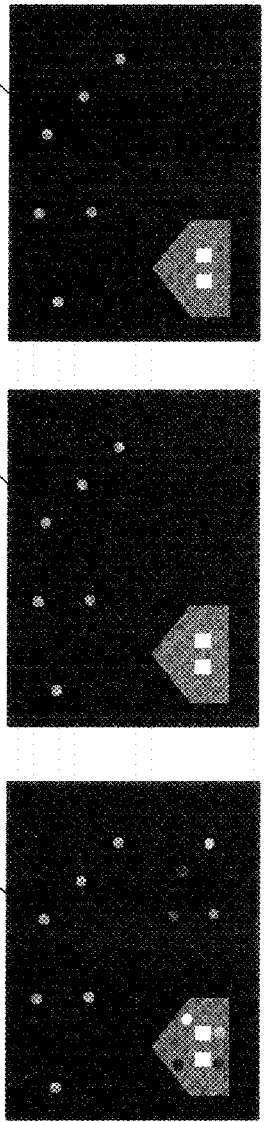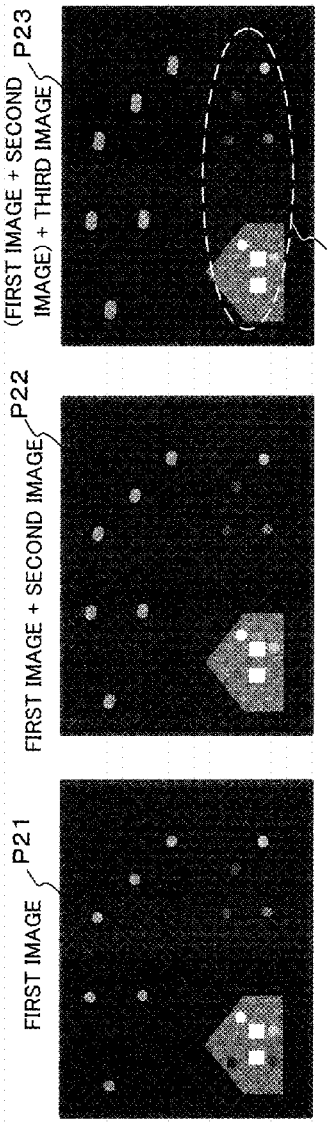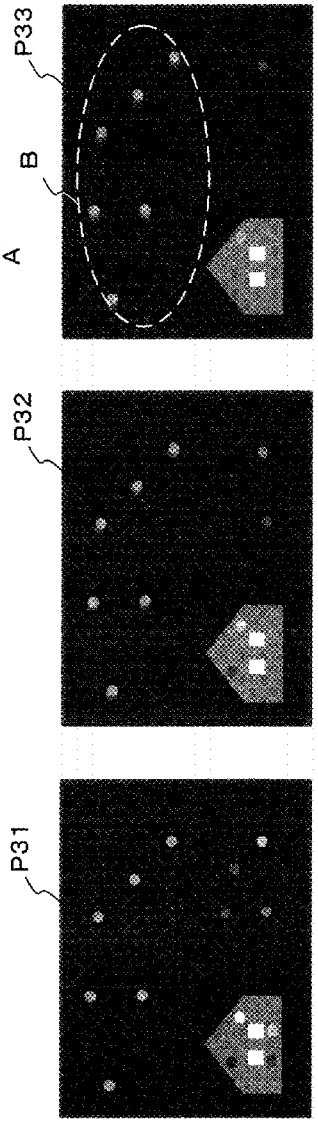
FIG. 11

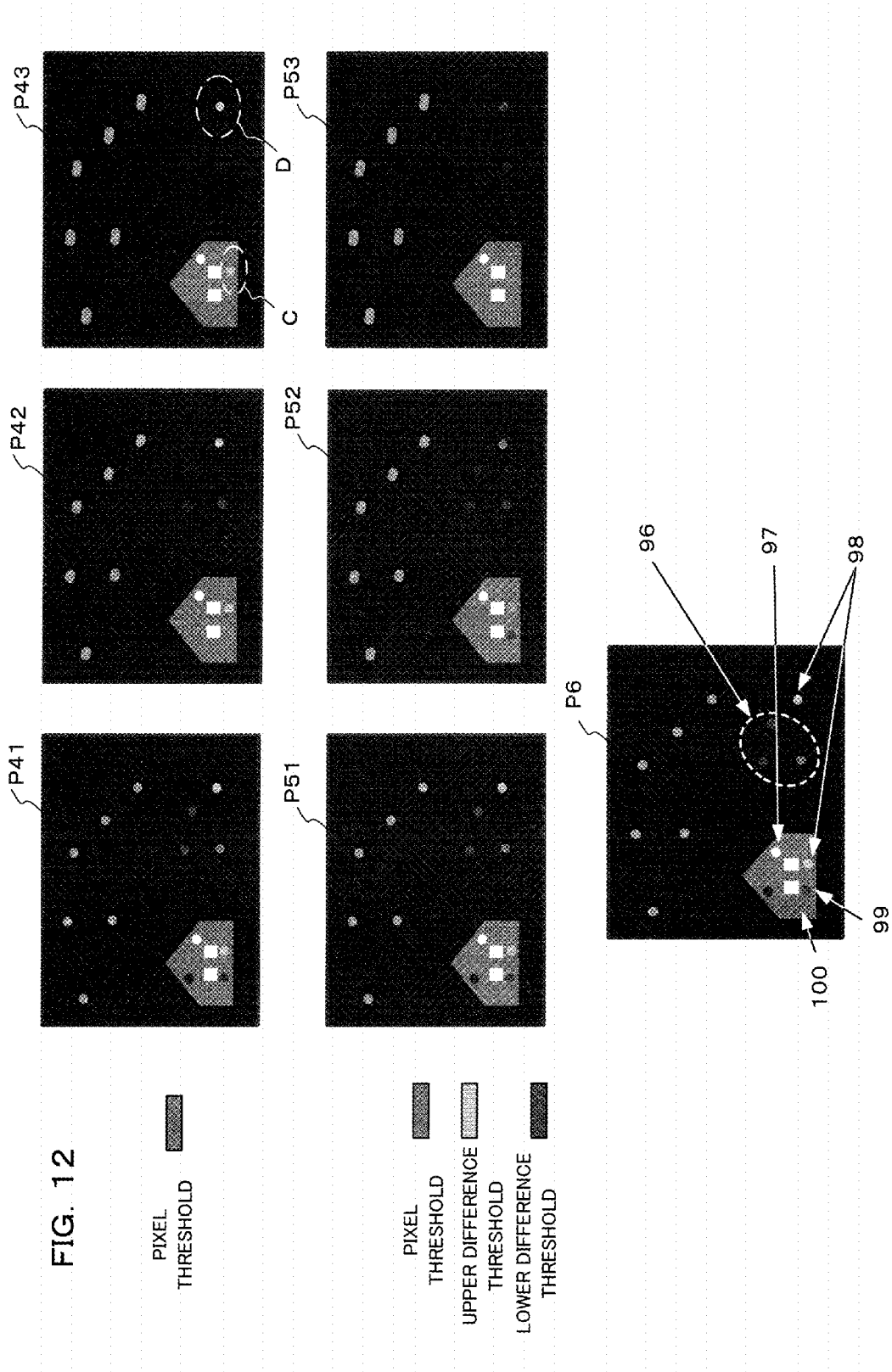

IMAGING DEVICE AND IMAGING METHOD

Benefit is claimed, under 35 U.S.C. § 119, to the filing date of prior Japanese Patent Application No. 2015-241108 filed on Dec. 10, 2015. This application is expressly incorporated herein by reference. The scope of the present invention is not limited to any requirements of the specific embodiments described in the application.

BACKGROUND OF THE INVENTION

1. Field of the Invention

The present invention relates to an imaging device and imaging method that, when carrying out shooting over a comparatively long time, generate combined image data from a plurality of image data that have been sequentially acquired during the course of shooting.

2. Description of the Related Art

It has become possible for even a novice to carry out shooting expertly and easily while confirming light trails, such as photographs of astral bodies, fireworks and light art etc. with live view, by installing image processing functions such as additive combination and comparatively bright combination in an imaging device such as a digital camera. Situations where shooting is performed to leave behind trails of light rays mainly utilize additive combination and comparatively bright combination functions.

Comparatively bright combination generates combined image data by comparing pixel values (brightness level) of pixels at the same pixel position when combining a plurality of images, and adopting bright pixels. For example, in Japanese patent laid-open No. 2013-062740 (hereafter referred to as patent publication 1) there is proposed an imaging device with which a user can take clear pictures leaving behind trails of light rays while confirming a time-lapse image at the time of shooting with live view.

Also, in Japanese patent laid-open No. 2013-172372 (hereafter referred to as patent publication 2) there is also proposed an imaging device with which image processing is changed in accordance with average brightness difference between a first image and images taken after the first image, so as to further reduce the risk of failure. Adding and averaging combination is generally known as a method that inhibits random noise. A dynamic shooting method that uses adding and averaging combination is proposed in Japanese patent application No. 5446847 (hereafter referred to as patent publication 3). An imaging device that is capable of respectively independently adjusting brightness of a background and light trails using a combination of comparatively bright combination and comparatively dark combination is disclosed in Japanese patent laid-open No. 2014-212415 (hereafter referred to as patent publication 4).

By using the imaging methods proposed in patent publications 2 and 4, it becomes easy to shoot trails of light rays. However, when shooting light trails, since processing is performed on the basis of comparatively bright combination, noise level is dominant in a first taken image. As a result, in order to obtain a combined image in which image noise has been reduced, how an initial first image is taken with low noise becomes a point at issue, and shooting with increased ISO sensitivity is difficult. Conversely, if processing is performed on the basis of adding and averaging combination to reduce noise, in places where the background is dark trails of light rays gradually become thinner every time adding and averaging processing is applied.

SUMMARY OF THE INVENTION

An object of the present invention is to provide an imaging device and imaging method that can further inhibit random noise and enable trails of light rays to remain clearly, when obtaining a combined image by combining a plurality of images in accordance with brightness.

An imaging device of a first aspect of the present invention comprises an image sensor that forms a subject image and generates image data, an image data memory that stores image data, a first combination processing circuit that carries out first cumulative combination processing for every pixel of image data that has been generated by the image sensor and image data that has been stored in the image data memory, and updates pixel data, a second combination processing circuit that carries out second cumulative combination processing for every pixel of image data that has been generated by the image sensor and image data that has been stored in the image data memory, and updates pixel data, and a controller that compares level of each pixel data constituting image data that has been generated by the image sensor with a given threshold level, and in accordance with the result of comparison selects to either carry out the cumulative combination processing by the first combination processing circuit, or to carry out the second cumulative combination processing by the second combination processing circuit, on each pixel data constituting image data that has been generated by the image sensor.

An imaging method of a second aspect of the present invention comprises forming a subject image using an image sensor and generating image data, storing image data, comparing level of each pixel data constituting image data that has been generated by the image sensor with a given threshold, and in accordance with the result of comparison selecting to either carry out first cumulative combination processing or to carry out second cumulative combination processing, on each pixel data constituting image data that has been generated by the image sensor, wherein in a case where the first cumulative combination processing has been selected, carrying out first cumulative combination processing for every pixel of image data that has been generated by the image sensor and image data that has been stored in the image data memory, and updating pixel data, and in a case where the second cumulative combination processing has been selected, carrying out second cumulative processing for every pixel of image data that has been generated by the image sensor and image data that has been stored in the image data memory, and updating pixel data.

BRIEF DESCRIPTION OF THE DRAWINGS

FIG. 11 is a drawing showing interim time-lapse images generated by comparatively bright combination and comparatively dark combination, in the camera of the first and second embodiments of the present invention.

FIG. 12 is a drawing showing interim time-lapse images generated by selectively switching between comparatively bright combination and comparatively dark combination in accordance with pixel level etc., in the camera of the first and second embodiments of the present invention.

DETAILED DESCRIPTION OF THE PREFERRED EMBODIMENTS

An example where a digital camera is adopted as a first embodiment of the present invention will be described in the following. This camera has an image sensor, with a subject image being converted to image data by this image sensor, and the subject image being subjected to live view display on a display section arranged on the rear surface of the camera body based on this converted image data. A photographer determines composition and photo opportunity by looking at a live view display. At the time of a release operation image data is stored in a storage medium. Image data that has been stored in the storage medium can be subjected to playback display on the display section if playback mode is selected.

Also, if a mode such as cumulative combination mode (for example, a long time exposure mode such as live bulb) is selected with this camera, image data is read out from the image sensor at given time intervals, from when commencement of exposure has been instructed by the user until completion of exposure has been instructed, combination processing such as comparatively bright combination or adding and averaging combination is carried out using this read out image data, and if a shooting completion instruction is issued the image data that has been subjected to combination processing is stored in external memory. Ina case where the subject is stars etc., this results in an image recording star trails or the like.

Further, this camera is capable of setting a threshold for pixel level automatically or manually, with a determination as to whether a pixel level is brighter or darker than the threshold level being performed for every pixel, and which combination processing to use, such as whether to carry out comparatively bright combination or to carry out adding and averaging combination etc., is selected from among a plurality of combination processing methods based on the result of this determination. As a result of this processing it becomes possible to reduce image noise.

Figure 1A:
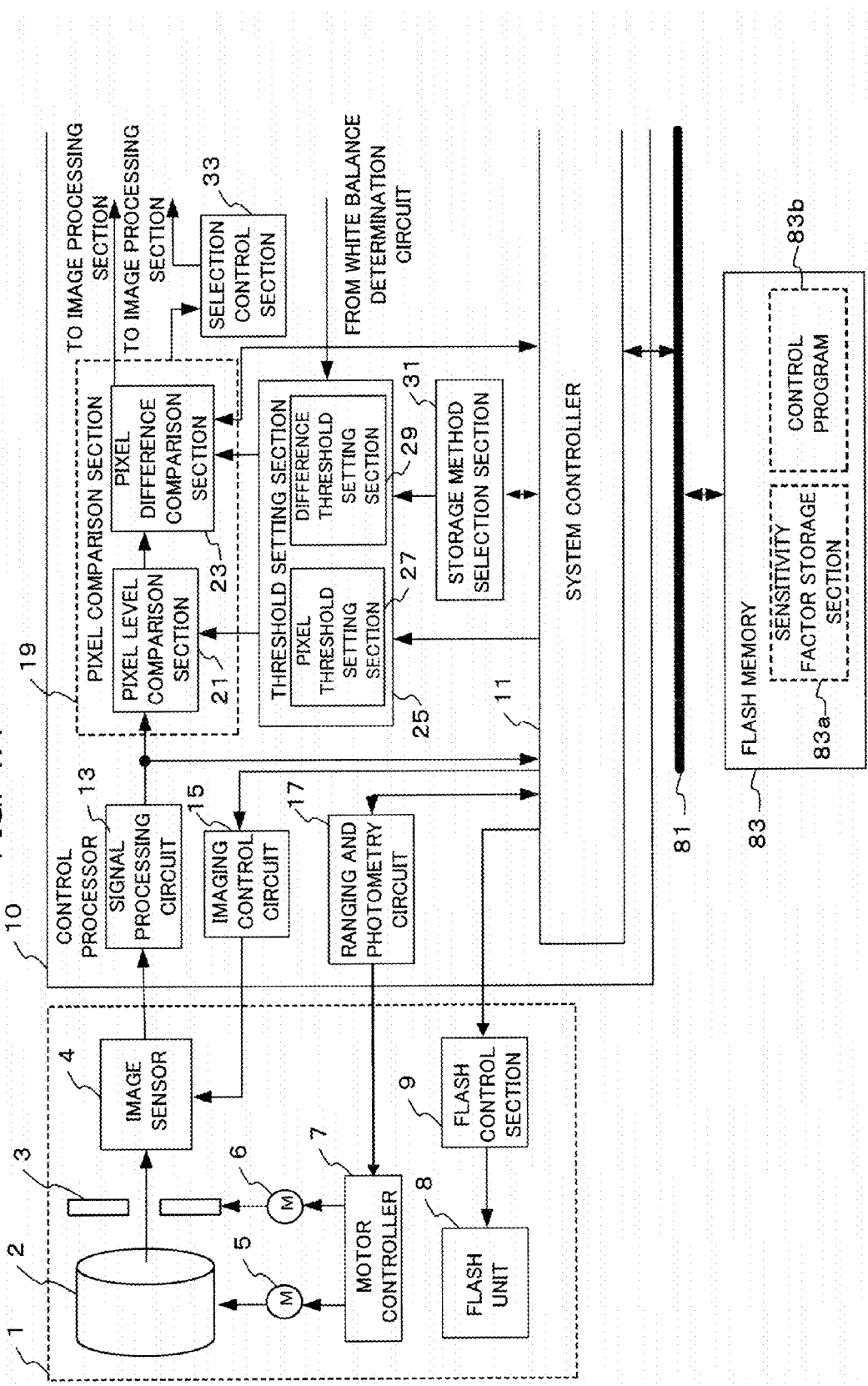
FIG. 1A and FIG. 1B are block diagrams mainly showing the electrical structure of a camera of a first embodiment of the present invention.
Figure 1B:
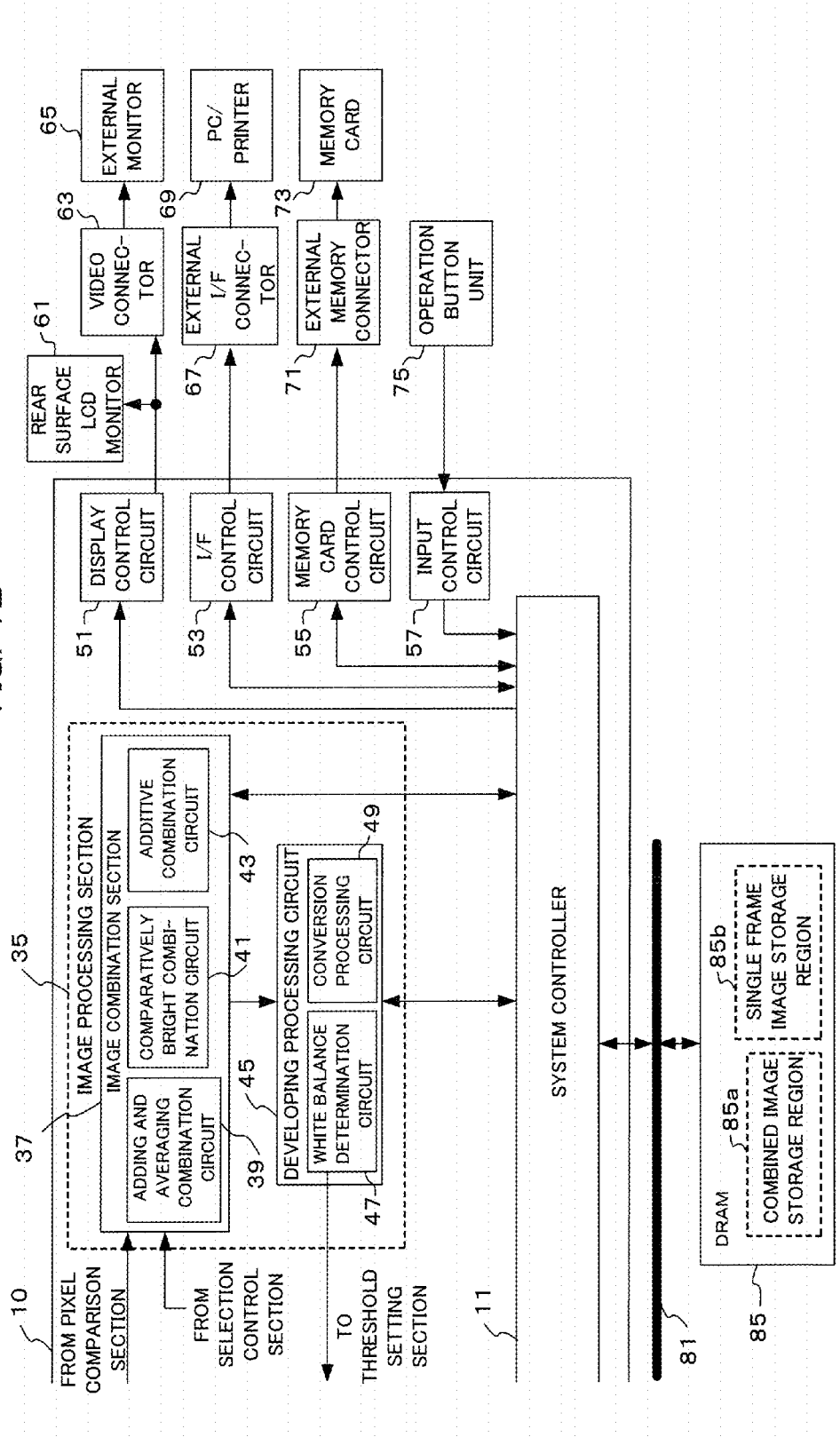

FIG. 1A and FIG. 1B are block diagrams mainly showing the electrical structure of a camera of a first embodiment. Within a lens barrel 1 there are a lens unit 2, a shutter unit 3, an image sensor 4, a lens drive motor 5, a shutter drive motor 6, a motor control section 7, a flash unit 8, and a flash control section 9. It should be noted that the lens barrel 1 may be formed integrally with a camera body, or may be constructed to be removable from the camera body.

The lens unit 2 has a prime lens or zoom lens, and forms a subject image on the image sensor 4. A focus lens within the lens unit 2 can be moved along the optical axis direction by the lens drive motor 5. The shutter unit 3 is arranged on the optical axis of the lens unit 2, and is a mechanical shutter such as a focal plane shutter. This shutter unit 3 can be opened up or closed down by the shutter drive motor 6. If the shutter unit 3 is opened up, subject light flux from the lens unit 2 is focused on the image sensor 4, while if the shutter unit 3 is close down the subject light flux is shielded.

The motor control section 7 carries out drive control of the lens drive motor 5 and the shutter drive motor 6 based on control signals from a ranging and photometry section 17, which will be described later. Specifically, automatic focus adjustment is carried out based on a ranging result from the ranging and photometry circuit 17 so that the focus lens within the lens unit 2 is brought in to a focused state. Shutter speed control is also carried out using the shutter unit 3 based on photometry results from the ranging and photometry circuit 17, so as to achieve appropriate exposure. It should be noted that in the event that cumulative combination mode has been set, the shutter unit 3 is opened up in response to a shooting commencement instruction from the user, while the shutter unit 3 is closed down in response to a shooting completion instruction. Also, although an aperture and aperture drive motor are not illustrated in FIG. 1A, aperture control may also be performed based on the control signals from the ranging and photometry circuit 17 so as to achieve appropriate exposure.

The image sensor 4 is a fixed image sensor such as a CMOS image sensor or a CCD image sensor, having a plurality of pixels arranged two dimensionally, and captures an optical image to generate image data. Specifically, an optical image of the subject that has been formed by the lens unit 2 is subjected to photoelectric conversion, followed by A/D conversion to generate image data, and the image data is output to a signal processing section 13.

Figures 2, 3:
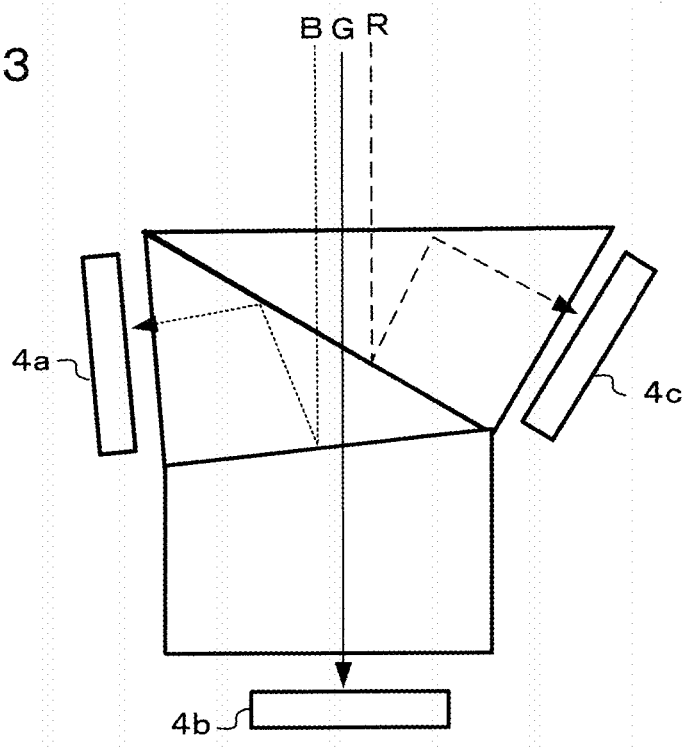
FIG. 2 is a plan view showing a color filter structure for an image sensor of the camera of the first embodiment of the present invention.
FIG. 3 is a drawing showing the structure of an image sensor having a three-sensor system, in a modified example of the camera of the first embodiment of the present invention.

With this embodiment, a single CMOS image sensor having filters, for example, color filters arranged in an RGB Bayer array, as shown in FIG. 2, arranged on an imaging surface of the image sensor 4, has been used. However, the present invention is not limited to this single sensor, and other imaging methods may be used, such as a method that uses a 3 image sensors such as shown in FIG. 3, or a method that uses a plurality of image sensors. Specifically, light may be divided for each wavelength and a plurality of image sensors arranged. With the example shown in FIG. 3, using three prisms, the subject light flux is broken down into three colors (RGB), respective image data is generated by receiving blue light (B) using the image sensor 4a and subjecting to photoelectric conversion, receiving green light (G) using the image sensor 4b and subjecting to photoelectric conversion, and receiving red light (R) using the image sensor 4c and subjecting to photoelectric conversion, then generating the respective image data and outputting the image data to the signal processing circuit 13.

The image sensor 4 may also have an electronic shutter, and exposure time can be electronically controlled. By using an electronic shutter, it is possible, when continuously shooting a plurality of images, to make the interval between images as small as possible. Also, by carrying out combination processing based on taken images, it is possible to continuously develop a trail of a subject that moves at high speed. Timing for exposure commencement and exposure completion of the image sensor 4 may use this electronic shutter or may use a combination of the previously described shutter unit 3 and the electronic shutter. In the event that cumulative combination mode has been set, exposure control for every given period is carried out using an electronic shutter, from when the user issues a shooting commencement instruction until a shooting completion instruction.

The lens unit 2, shutter unit 3, image sensor 4 and signal processing circuit 13, which will be described later, together make up the image section. This image section forms a subject image and generates image data. It should be noted that the image section only has to have at least the image sensor 4.

The flash unit 8 has a flash section such as a xenon tube, and irradiates supplementary light to the subject. The flash control section 9 controls flash timing and flash amount of the supplementary light, in accordance with control signals from the system controller 11. It should be noted that besides a xenon tube, other light emitting elements such as LEDs etc. may also be used as the flash unit 8.

A control processor 10 is constituted by an ASIC (Application Specific Integrated Circuit) having a CPU (Central processing unit) and a DSP (digital signal processor). It should be noted that, as will be described later, the control processor 10 has various functions, but is not limited to a single circuit substrate, and may be formed using a plurality of circuit substrates. Also, various functions (for example, a pixel comparison section, threshold setting section, selection control section etc.) are not limited to hardware circuits, and may be implemented by the CPU using control programs that have been stored in flash memory 83, and using DSP programs.

Inside the control processor 10 there are a system controller 11, signal processing circuit 13, imaging control circuit 15, ranging and photometry circuit 17, pixel comparison section 19, threshold setting circuit 25, storage method selection section 31, selection control section 33, image processing circuit 35, display control circuit 51, I/F control circuit 53, memory card control circuit 55 and input control circuit 57.

The imaging control circuit 15 carries out imaging control for the image sensor 4 based on control signals from the system controller 11. As imaging control, commencement of exposure, completion of exposure, and read out of pixel data from each pixel, are carried out The signal processing circuit 13 carries out noise reduction processing, A/D conversion etc. on the image data that has been read out from the image sensor 4, using signal amplification and correlated double sampling, and is mainly constituted by hardware circuitry. It should be noted that the signal processing circuit 13 may also be configured to carryout similar processing within the image sensor 4. Image data that has been subjected to processing by the signal processing circuit 13 is input to the pixel comparison section 19 and the system controller 11.

The ranging and photometry circuit 17 generates control signals for driving the focus lens within the lens unit 2 to a focus position, and generates exposure control signals such as shutter speed for achieving appropriate exposure, based on control signals from the system controller 11. Specifically, based on the image data from the signal processing circuit 13, the system controller 11 outputs control signals for automatic focus adjustment using a contrast method, for example, and calculates subject brightness value based on image data, and based on this subject brightness value calculates exposure control values for achieving appropriate exposure, such as shutter speed and ISO sensitivity, and outputs control signals. Also, although a phase difference sensor and subject illuminance sensor are not illustrated in FIG. 1A, motor control amounts for an automatic focus adjustment motor and exposure control values may be calculated by the system controller 11 from output results of a phase difference detection sensor and subject illuminance sensor, and the control signals may be output to the ranging and photometry circuit 17.

The system controller 11 is for providing unified control of the camera overall, and is constituted by, for example, a CPU and peripheral circuits of the CPU. The system controller 11 controls imaging drive circuitry within the imaging control circuit 15, and carries out control of the image sensor 4. If cumulative combination mode has been set and a shooting operation has been performed, the system controller 11 controls the image sensor so that a series of image data groups are sequentially generated.

The storage method selection section 31 selects a storage method for when storing image data that has been acquired as a result of shooting (including image data that has been processed in cumulative combination mode) in the memory card 73. The storage method is set by the user operating the operation button unit 75 at the time of menu screen display. This storage method that has been set is stored in flash memory 83, and so at the time of storage of image data a storage method that has been stored in flash memory 83 is read out and used.

The threshold setting section 25 sets a determination threshold level for each color based on control signals from the system controller 11. The pixel threshold setting section 27 sets pixel threshold used when determining whether to carryout comparatively bright combination or to carry out adding and averaging combination, in accordance with pixel data for every pixel (refer to S7 in FIG. 4 and S8 in FIG. 9). A difference threshold setting section 29 is used in a second embodiment which will be described later, and sets a difference threshold that is used when determining whether to carry out comparatively bright combination or to carry out adding and averaging combination, in accordance with difference between pixel level of a combined image and pixel level of a currently acquired image (refer to S8 in FIG. 9). Also, the pixel threshold and the difference threshold are set taking into consideration output results of a white balance determination circuit 47, depending on a result of storage method selection for the image (refer to S51, S57 and S59 in FIG. 5, and S51, S57, S59 and S60 in FIG. 10).

The pixel comparison section 19 has a pixel level comparison section 21 and a pixel difference comparison section 23. The pixel level comparison section 21 compares a pixel threshold that has been set in the pixel threshold setting section 27 with a level of pixel data that has been read out from the image sensor 4, and outputs the results of this comparison to a selection control section 33. The pixel comparison section 19 functions as a pixel comparison section that determines whether or not a level of each pixel data constituting image data that has been formed by the imaging section is a given threshold level or greater (referred to S15 in FIG. 4).

Figure 4:
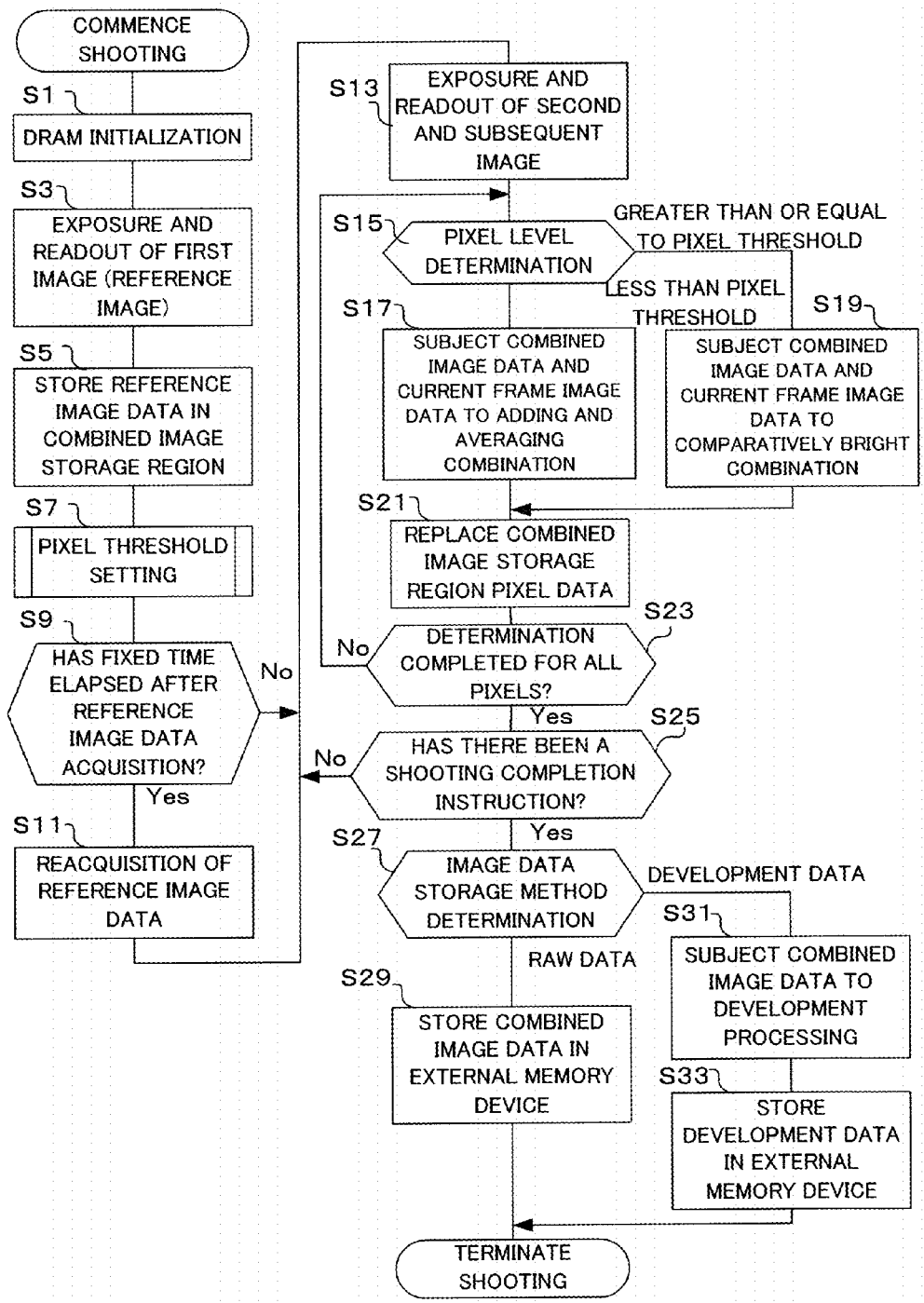
FIG. 4 is a flowchart showing shooting operation of the camera of the first embodiment of the present invention.

The selection control section 33 selects whether to carry out adding and averaging combination or to carry out comparatively bright combination processing based on the comparison result from the pixel comparison section 19, and outputs to the image synthesis circuit 37 (refer to S15, S17, S19 and S21 in FIG. 4). The selection control section 33 functions as a selection control section for carrying out control in order to select whether to carry out adding and averaging using adding and averaging combination or to carry out comparatively bright combination using the comparatively bright combination circuit, in accordance with determination results from the pixel comparison section, for each of the pixel data constituting image data that has been generated by the imaging section.

Also, the selection control section 33 functions as a selection control section for performing control so as to carry out comparatively bright combination on each of the pixel data constituting the image data that has been generated by the imaging section, when it has been determined that level of each of the pixel data constituting the image data that has been generated by the imaging section is greater than or equal to the threshold level that has been set, and performs control so as to carry out adding and averaging on each of the pixel data constituting the image data that has been generated by the imaging section when level of each of the pixel data constituting the image data that has been generated by the imaging section is lower than a given threshold level (refer to S15, S17 and S19 in FIG. 4).

The pixel difference comparison section 23 is used in a second embodiment, which will be described later, and compares a difference between pixel levels of a combined image and pixel levels of a currently acquired image with a threshold that has been set in the difference threshold setting section 29, outputting the result of this comparison to the selection control section 33. The selection control section 33 selects whether to carryout adding and averaging combination or to carry out comparatively bright combination processing based on the comparison result from the pixel comparison section 19, and outputs to the image combination circuit 37 (refer to S16, S17, S19 and S21 in FIG. 9).

The image processing circuit 35 has an image synthesis circuit 37 for combining a plurality of image data, and a developing processing circuit 45 for subjecting RAW data from the image sensor 4 to image processing such as development processing etc.

The image combination circuit 37 has an adding and averaging combination circuit 39 that carries out adding and averaging combination processing, a comparatively bright combination circuit 41 that carries out comparatively bright combination processing, and an additive combination circuit 43 that carries out additive combination processing. It should be noted that in this embodiment, although these three combination circuits have been provided this is not limiting, and a combination of two of the circuits, such as the adding and averaging combination circuit 39 and the comparatively bright combination circuit 41, or the adding and averaging combination circuit 39 and the additive combination circuit 43, is also possible.

The adding and averaging combination circuit 39 is constituted by hardware circuits, and performs combination processing to add pixel data for every pixel respectively corresponding to two sets of image data, and divide by 2, and then replace pixel data with the result of this calculation (adding and averaging value). This adding and averaging combination circuit 39 functions as an adding and averaging combination section that performs adding and averaging, for every pixel, of image data that has been generated by the imaging section and image data that has been stored in the image data memory (refer, for example, to the DRAM 85), and updates pixel data that has been subjected to additive combination, among the image data that has been stored in the image data memory.

The comparatively bright combination circuit 41 is constituted by hardware circuits, and carries out combination processing to compare pixel data for every pixel respectively constituting two sets of image data, and replace each pixel data with whichever pixel data is brightest. The comparatively bright combination processing circuit 41 functions as a comparatively bright combination circuit that carries out comparatively bright combination for every pixel of image data that has been generated by the imaging section and image data that is stored in the image data memory, and updates pixel data that has been subjected to comparatively bright combination, among the image data that has been stored in the image data memory. The additive combination circuit 43 is constituted by hardware circuits, and performs combination processing to add pixel data for every pixel respectively corresponding to two sets of image data, and then replace pixel data with the result of this calculation (addition value).

The image synthesis circuit 37 executes either adding and averaging combination, comparatively bright combination or additive combination, based on instruction from the selection control section 33. The image synthesis circuit 37 repeatedly carries out combination processing in accordance with an instruction from the selection control section 33, every time image data for a combined image from the imaging section is generated (for example, every time a second or subsequent image is read out in S13 of FIG. 4).

The developing processing circuit 45 has a white balance determination circuit 47 and a conversion processing circuit 49, and applies development processing to image data that has been combined by the image synthesis circuit 37 based on information that has been set, in accordance with instruction from the system controller 11. Although details are not illustrated, processing such as various correction processing such as shading correction, gamma correction, distortion correction and defect correction etc., and demosaicing processing etc. are carried out by the conversion processing circuit 49.

Also, the white balance determination circuit 47 subjects image data to known white balance processing. White balance processing subjects pixel data of R pixels and B pixels to a multiplication operation at a given ratio, with levels of G pixels as a reference, so to display white as white. This white balance (given ratio) is output to the threshold setting section 25, and, in the event that a storage method is development data, is used when calculating pixel threshold values for each color.

Whether to save image data after development processing by the developing processing circuit 45 or to store RAW data from the imaging section is determined using the selection result of the storage method selection section 31. In accordance with this determination, the image data is stored in a storage device such as flash memory 83 or external memory (for example, memory card 73) as a result of instruction from the system controller 11. It should be noted that storage of both the data after development processing and the RAW data is also possible.

The display control circuit 51 carries out control in order to display image data after development processing by the developing processing circuit 45 and various setting information of the camera etc. on an external monitor 65 or the like, rear surface LCD (Liquid Crystal Display), monitor 61 or EVF (Electronic View Finder) etc. Connection to the external monitor 65 is made by means of a video connector 63. Although not illustrated, in a case where a wireless interface such as WiFi (Wireless Fidelity) is provided, image data may be displayed on a user's smart phone or laptop PC (Personal Computer) by means of the wireless interface.

An I/F (interface) control circuit 53 controls an interface for external devices connected to the camera. It should be noted that depending on the external device connected, there are various standards such as for USB interface, WiFi and Bluetooth, and the I/F control circuit 53 is capable of connecting to the external devices in accordance with these standards.

A memory card control circuit 55 carries out storage and readout control of data, such as image data, to and from the memory card 73, by means of an external memory connector 71. As described previously, the image data may be stored as image data after development processing, or RAW data.

The operation button unit 75 has buttons that are physically pressed and a rotating dial etc. in order for the user to carry out various settings and actually perform shooting. Operating states of the operation button unit 75 are input to the system controller 11 by means of an input control circuit 57. Although not illustrated, in a case where a wireless interface such as WiFi is provided, operations may be performed remotely from the user's smart phone or laptop PC by means of the wireless interface.

The DRAM (Dynamic Random Access Memory) 85 is an electrically rewritable volatile memory, and temporarily holds various data. As an image data memory, the DRAM 85 temporarily holds image data, and has a combined image storage region 85*a* and a single frame image storage region 85*b*. It should be noted that the single frame image storage region 85*b* is not limited to a single frame, and may have a storage region for multiple frames. Also, as long as it is capable of temporarily holding image data, the image data memory need not be DRAM, and may use other memory, or a combination of a plurality of types of memory. Further, although not illustrated, a region used for conditions used in other image processing, and camera conditions, may also be included.

The flash memory 83 is an electrically rewritable non-volatile memory, and has regions such as a sensitivity factor storage section 83*a* and a region for control programs 83*b* etc. The flash memory 83 reads out and outputs stored data and programs in response to requests from the system controller 11. Although not illustrated, initial states of the camera, user settings, and storage method selection result etc. may be stored in the flash memory 83.

A bus 81 is connected to the system controller 11, flash memory 83, DRAM 85 etc., and is a signal path for data and control signals etc. Data such as image data and control signals (instructions) from the system controller 11 is communicated by means of the bus 81.

Next, operation of this embodiment will be described using the flowcharts shown in FIG. 4 and FIG. 5. These flowcharts (also including FIG. 9 and FIG. 10 that will be described later) are executed by a CPU within the controller 11 controlling each section within the camera in accordance with a control program 83*b* within the flash memory 83.

Figure 5:
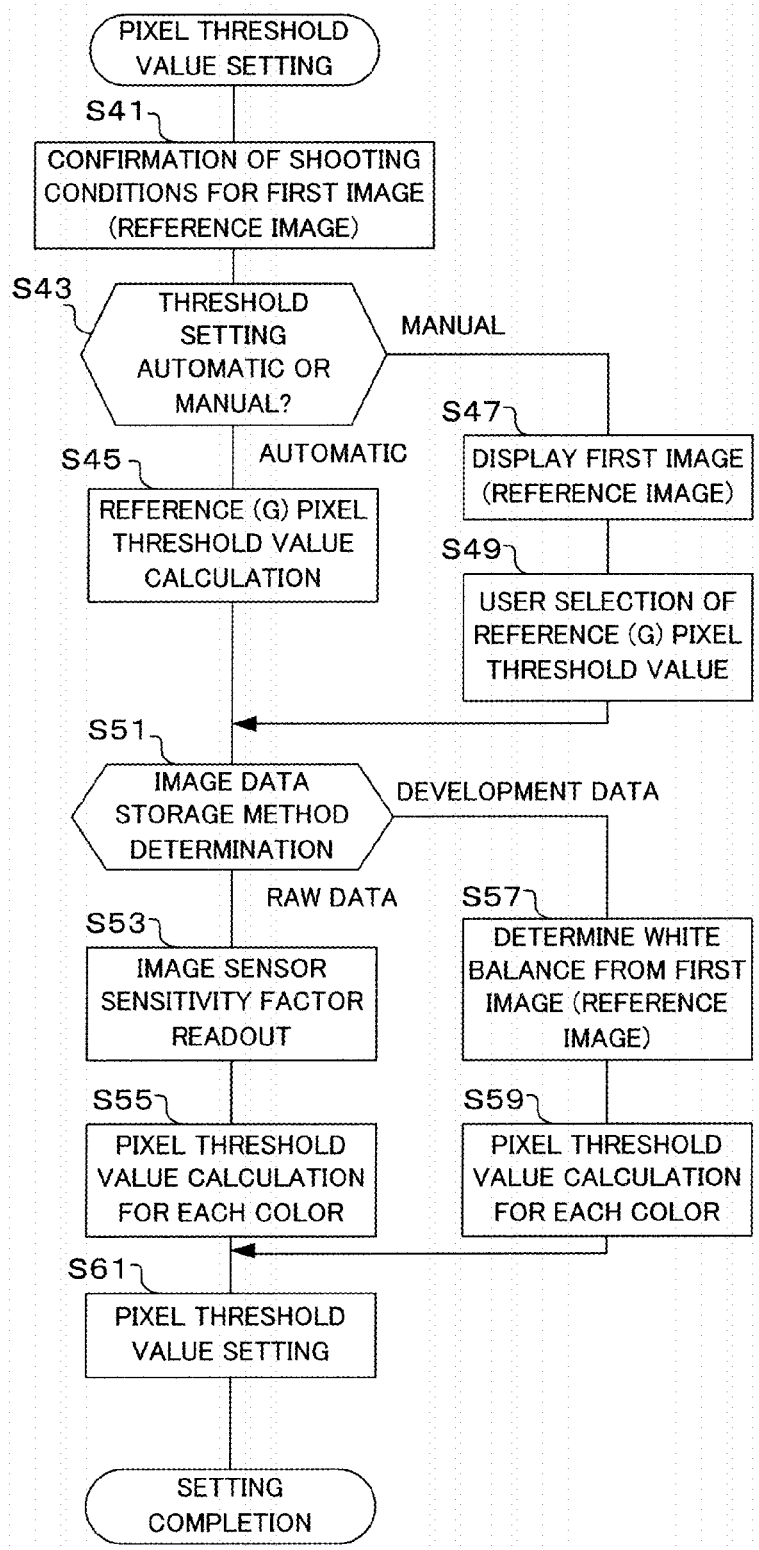
FIG. 5 is a flowchart showing operation for pixel threshold setting of the camera of the first embodiment of the present invention.

In the state where the camera has been set to a cumulative combination mode, such as night scene shooting mode, if the release button is pressed down the image combination processing shown in the flowcharts of FIG. 4 and FIG. 5 is commenced. First, initialization of the DRAM is carried out (S1). Here, memory sections such as the DRAM 85 are initialized, and the combined image storage region 85*a* and the single frame image storage region 85*b* are secured.

Next, a first exposure is executed, and taken image data is read out from the image sensor 4 (S3). If this first exposure is set to auto mode as a shooting condition, the shooting carried out in conformity with a program chart of the camera. Also, at the time of manual mode shooting is carried out with shooting conditions that have been set by the user.

Once the first exposure and readout have been carried out, next reference image data is stored in a combined image storage region (S5). The first image data that has been read out from the image sensor 4 (hereafter referred to as reference image data) is temporarily stored in the combined image storage region 85*a* of the DRAM 85, by means of the system controller 11.

Once a reference image has been stored in the combined image storage region, next pixel threshold setting is carried out (S7). In this embodiment, pixel data and the pixel threshold are compared for every pixel, and whether to carry out comparatively bright combination or to carry out adding and averaging combination is selected on the basis of the results of this comparison. In this step setting of this pixel threshold is carried out. In setting this pixel threshold, the same value may be set for every RGB color, but with this embodiment a different value is set for each RGB color. Detailed operation of the pixel threshold setting will be described later using FIG. 5.

If the pixel threshold has been set, it is next determined whether or not a fixed time or greater has elapsed after reference image data acquisition (S9). As was described previously, after acquisition of the reference image data in step S3, the pixel threshold is set in step S7. There is a possibility that setting of pixel threshold will be carried out manually, and that the user will take time perform the settings, and an appropriate time will elapse. In this case, if shooting of a second transition is commenced without checking on elapsed time, there may be cases where an image that is different to the image that was taken in step S3 is taken. In this step therefore, it is determined whether or not a fixed time has elapsed, and if the fixed time has elapsed reference image data is acquired again in step S11.

If the result of determination in step S9 is that a fixed time or more has elapsed since reference image data acquisition, reference image data is reacquired (S11). Here, image data is acquired from the image sensor 4, and stored in the combined image storage region.

If reference image data has been reacquired in step S11, or if the result of determination in step S9 was that a fixed time or more has not elapsed after reference image data acquisition, next second and subsequent images are exposed and read out (S13). In this step, taken images for second and subsequent single frame images are read out from the image sensor 4. Specifically, once exposure has been carried out for a given exposure time using the electronic shutter of the image sensor 4, image data is read out from the image sensor 4. The second and subsequent single frame image data that have been read out are temporarily stored in the single frame image storage region 85*b*. Also, once image data has been read out the image sensor 4 commences the next exposure.

Once exposure and readout of the second and subsequent images has been carried out, next pixel level determination is carried out (S15). Specifically, each time exposure for a given time is carried out, each pixel data of the image data that has been read out (that is being temporarily stored in the single frame image storage region 85*b*) and the pixel threshold are compared, and it is determined whether the pixel data is larger or smaller than the pixel threshold. A value that was determined in step S7 (refer to S61 in FIG. 5 for details) is used for this pixel threshold. A pixel threshold comparison result flag for whether or not the pixel threshold value has been exceeded is set, and transmitted to the selection control section 33.

If the result of determination in step S15 is that a pixel level is less than the pixel threshold, then combined image data and image data of the current frame are subjected to adding and averaging combination (S17). In this case, it is a situation where the pixel threshold comparison result flag has been set to indicate that the pixel threshold value has not been exceeded, the selection control section 33 selects the adding and averaging combination circuit 39 from within the image synthesis circuit 37, and adding and averaging combination processing is carried out with pixel data of the same address in the combined image.

If the result of determination in step S15 is that a pixel level is equal to or greater than the pixel threshold, then combined image data and image data of the current frame are subjected to comparatively bright combination (S19). In this case, it is a situation where the pixel threshold comparison result flag has been set to indicate that the pixel threshold value has been exceeded, the selection control section 33 selects the comparatively bright combination circuit 41 from within the image synthesis circuit 37, there is a comparison with pixel data for the same pixel addresses in the combined image data, and the brighter pixel data is selected.

If adding and averaging combination has been carried out in step S17, or if comparatively bright combination has been carried out in step S19, next combined image storage region pixel data is replaced (S21). In this step, for image data that is temporarily stored in the combined image storage region 85a, pixels that have been determined in step S15 are replaced with pixel data based on the results of combination processing in step S17 four step S19.

If replacement of the combined image storage region pixel data has been carried out, it is next determined whether or not determination has been completed for all pixels (S23). Here it is determined whether or not the pixel determination in step S15 has been completed for all pixels of the image data that was read out in step S13. If the result of this determination is that determination has not been completed for all pixels processing returns to step S15, and in accordance with a predetermined sequence, pixel level determination is carried out for the next pixel, image combination is carried out, and replacement of pixel data of the combined image storage region is carried out.

If the result of determination in step S23 is that determination has been completed for all pixels, it is determined whether or not there has been a shooting completion instruction (S25). In the event that the user terminates shooting, a shooting completion instruction is carried out such as pressing the release button down again. In this step, therefore, determination is based on the operating state of the operation button unit 75. It should be noted that although not illustrated, at a point in time where determination has been completed for all pixels, update of a combined image displayed on a display section, such as the rear surface LCD monitor 61, may be carried out.

If the result of determination in step S25 is that there is not a shooting completion instruction, processing returns to step S13. Exposure completion for the next image is then awaited, and wants exposure is complete then in steps S15 and after generation of combined image data is carried out, as described previously. Until there is a shooting completion instruction exposure and image data readouts are repeated at given time intervals, and every time image data is read out pixel level determination is carried out, adding and averaging combination or comparatively bright combination is selected for every pixel in accordance with the determination result, and combined image data is generated.

If the result of determination in step S25 is that a shooting completion instruction has been issued, next image data storage method determination is carried out (S27). Here, determination is based on the storage method that is set in the storage method selection section 31 (whether to store image data that has been subjected to development processing all to store RAW data).

If the result of determination in step S27 is to store RAW data, the combined image data is stored in an external memory device (S29). Here, combined image data (combined but still RAW data) that has been read out from the image sensor 4 and generated in steps S15-S23 is stored in an external memory device such as the memory card 73.

On the other hand, if the result of determination in step S27 is to store developed data, the combined image data is subjected to development processing (S31). Here, combined image data that has been read out from the image sensor 4 and generated in steps S15-S23 (combined but still raw data) is subjected to development processing in the developing processing circuit 45.

Next, image data that has been subjected to development processing is stored in an external memory device (S33). Here, image data that was subjected to development processing in step S31 is stored in an external memory device such as the memory card 73. It should be noted that in this flowchart storage is carried out using one storage method of either developed data or raw data, but this is not limiting, and it is also possible, for example, to store data using both storage methods.

If the image data has been stored in the external memory device in step S29 or S33, the flow for the shooting operation is completed.

Next, detailed operation of the pixel threshold setting in step S7 will be described using the flowchart shown in FIG. 5. In this flow, threshold value setting is carried out in the pixel threshold setting section 27 in the state where a reference image has been taken (refer to S3 in FIG. 4).

If the flow for pixel threshold setting is entered, first confirmation of shooting conditions for a first image (reference image) is carried out (S41). Here, the pixel threshold setting section 27 confirms shooting conditions for the reference image, such as, for example, ISO sensitivity, AE evaluation value, average brightness of the image etc.

Next, it is determined whether threshold setting is automatic or manual (S43). As a result of the user operating the operation button unit 75 at the time of menu screen display it is possible to set whether threshold setting is carried out automatically or carried out manually. In this step determination is based on this setting state.

If the result of determination in step S43 is that automatic is set, threshold value for the reference (G) pixels is calculated (S45). Here, the threshold value is set on the basis of the reference image shooting conditions. It should be noted that among the RGB pixels, here threshold value is calculated using G pixel values, and for other pixels calculation is performed in step S55.

On the other hand, if the result of determination in step S43 is that manual is set, a first image (reference image) is displayed (S47). Here, the reference image data is subjected to development processing, and the display control circuit 51 displays the processed reference image on the rear LCD 61 so that the user can see it.

Next, the user selects a reference (G) pixel threshold value (S49). Specifically, by designating an arbitrary position on the image the user can set a reference threshold value from a pixel level of the designated position.

Figure 6:
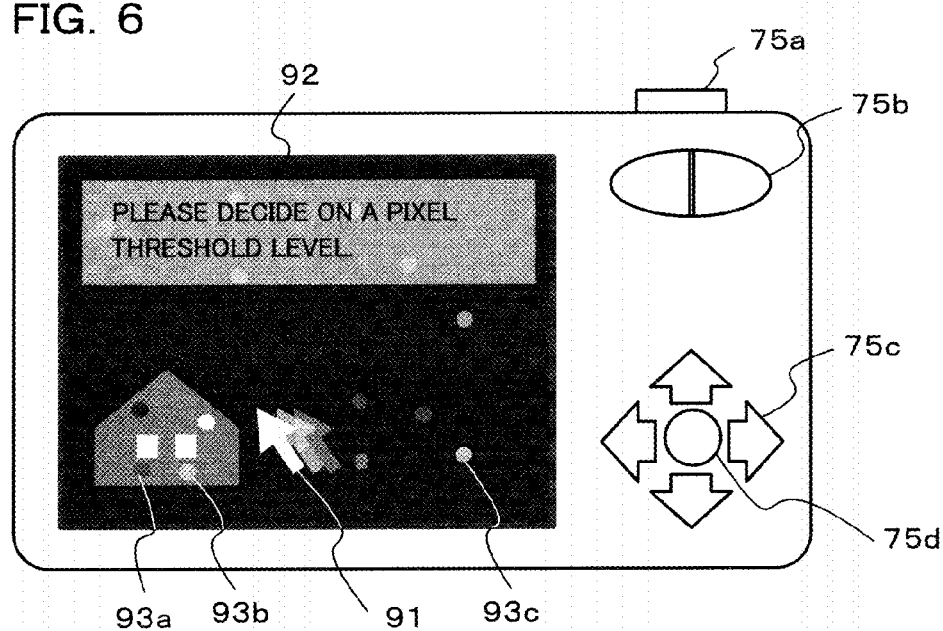
FIG. 6 is a drawing showing pixel threshold level setting in the camera of the first embodiment of the present invention.

Operation for pixel threshold value setting by the user will be described using FIG. 6. FIG. 6 is a drawing looking from the rear surface of the camera, showing a release button 75a, zoom button 75b, up, down, left and right buttons 75c, and a decision button 75d.

In the event that cumulative image mode has been set, then once shooting of a reference image is complete (refer to step S3), an advisory image 92 (with the example shown in FIG. 6 "please decide on a pixel threshold level") is displayed overlaid on the reference image, on the rear surface LCD monitor 61. A pointer 91 for the user to designate a pixel threshold is also displayed overlaid on the reference image. The position of this pointer 91 can be moved up, down, left and right by operation of the up, down, left and right buttons 75c.

A subject that is brighter than the pixel threshold value remains in the image as a result of comparatively bright combination, while a subject that is darker than the pixel threshold value gradually becomes fainter as a result of adding and averaging combination. Therefore, as a result of the user moving the pointer 91 on the darkest subject within a subject it is desired to retain as a light trail and then operating the decision button 75d, it is possible to set a pixel threshold. For example, if the pointer 91 is lined up on the subject 93c, a light trail of only a comparatively bright subject will result, while if the pointer 91 is lined up on the subject 93b a light trail of a subject having a brightness that is average or greater will result, and if the pointer is lined up on the subject 93a a light trail that also includes a comparatively dark subject will be taken. It should be noted that the pixel threshold value selected here is a pixel threshold value for G pixels. For R pixels and B pixels, pixel threshold values are calculated in steps S55 and S59.

Figure 7:
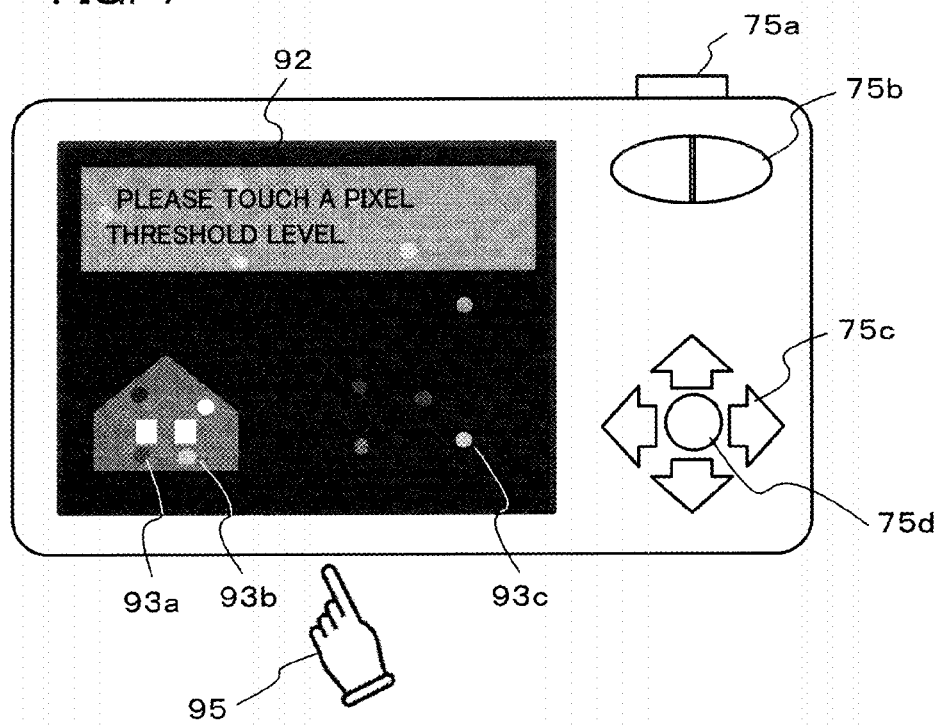
FIG. 7 is a drawing showing a modified example of pixel threshold level setting in the camera of the first embodiment of the present invention.

It should be noted that manual setting is not limited to being carried out by operation of the up, down, left and right buttons 75c. For example, as shown in FIG. 7, setting may be carried out using a touch operation. In this case, a touch panel is provided on the rear surface LCD monitor 61. With the example shown in FIG. 7, after shooting of the reference image, the user sets the pixel threshold value by simply touching a subject having a brightness it is desired to use as a reference using a finger 95, while looking at the reference image.

Returning to the flowchart shown in FIG. 5, if the G pixel threshold value has been calculated in step S45, or if the G pixel threshold value has been selected in step S49, next pixel threshold values for each color are calculated in steps S51 and after. Before describing the processing for steps S51 and after, calculation of pixel threshold value for each color will be described.

If pixel threshold values for selecting an image combination processing method are all set to the same value, then since sensitivity of the image sensor 4 is different for each color, while it will be easy for a color of high sensitivity (for example G) to exceed the threshold, for colors of low sensitivity (for example R and B) it is unlikely that the threshold will be exceeded. For example, when subject light of the same brightness passes over an RGB Bayer array on an image sensor, a phenomenon arises whereby for G within the subject light the threshold is exceeded, but for R and B the threshold is not exceeded. In this case, if development processing is carried out a tint arises in the trail of the subject.

Also, in order to determine white balance in accordance with the subject that has been taken, gain involved at the time of development processing is different for each color, and the phenomenon where an image after development has a tint also arises. For this reason, processing to optimize threshold value for each color is carried out in the pixel threshold setting section 27. For example, in a case where RAW data has been selected for the storage method, a threshold value for each color is determined in accordance with sensitivity of the image sensor 4 stored in a sensitivity factor storage section 83a of the flash memory 83.

In the event that only developed image is selected as a storage method, pixel threshold value for each color is determined on the basis of a white balance value that has been determined using reference image data from the viewpoint of simplifying processing. On the other hand, if the storage method selects both a raw image and developed image, the threshold values are set using the raw image, and development may be carried out later. Also, this is not limiting, and it is also possible, for example, to provide a combined image storage region for RAW storage and a combined image storage region for developed storage, and to create both a combined image for RAW storage and a combined image for developed storage by setting two pixel threshold values for the image data read-out from the image sensor 4.

Figure 8:
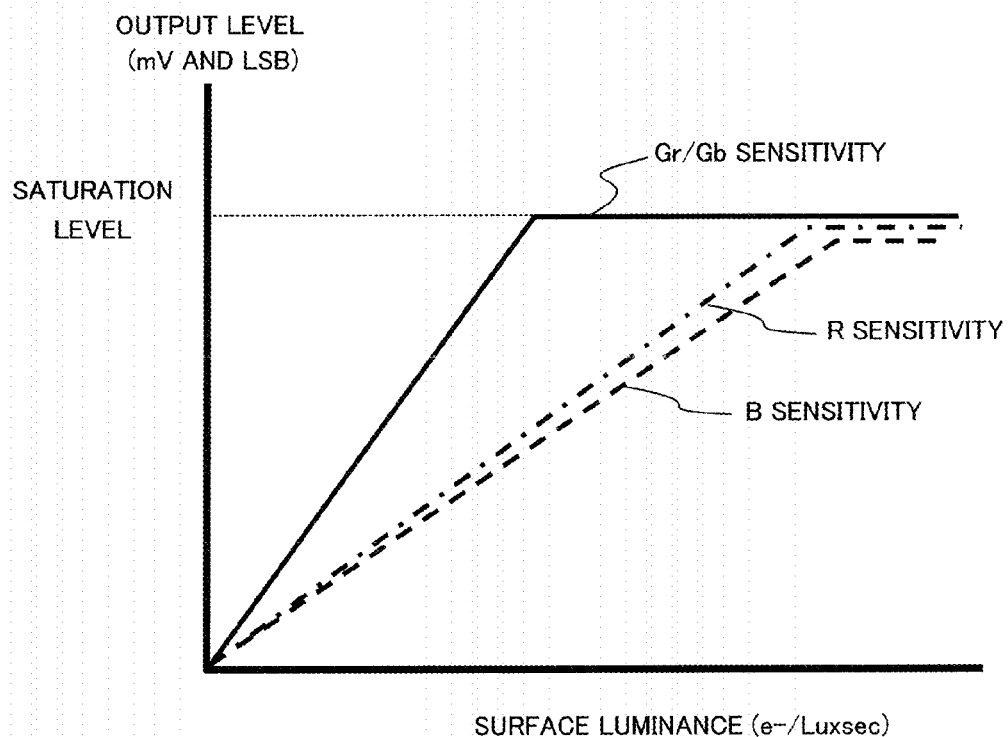
FIG. 8 is a graph showing an example of sensitivity difference for each color in the camera of the first embodiment of the present invention.

Sensitivity difference for each color when the image sensor 4 is made with a silicon base and an RGB Bayer color filter has been adopted is shown in FIG. 8, as one example. Generally, sensitivity of R pixels and B pixels is low compared to that of G pixels. For this reason values of G pixels are set as reference threshold values, and setting of threshold values for each color of R pixels and B pixels, that have low sensitivity, is calculated so that when a light amount, for which it is determined that the G pixels have exceeded the threshold, is received, it is determined that the R pixels and B pixels also exceed the thresholds.

It should be noted that only target sensitivity factors are stored in the sensitivity factor storage section 83a of the flash memory 83, and threshold values for each color that are set here may be recalculated automatically in accordance with shooting condition of the reference image (for example, ISO sensitivity etc.). The pixel threshold setting section 27 transmits the finally calculated threshold values for each color to the pixel comparison section 19.

After threshold has been set for each color, reacquisition of reference image data may be executed (refer to S9 and S11 in FIG. 4). This is because, particularly in a case where pixel threshold value has been set manually, depending on how much time is spent by the user on the setting, continuity of single frame image data that will be subjected to cumulative combination may be significantly disrupted temporally by only the reference image data. Accordingly, on condition that the pixel threshold values are set in automatic mode, and time continuity of the single frame data with the reference image data is ensured, reacquisition of reference image data need not be executed.

Returning to S51 in FIG. 5, determination of image data storage method is carried out in this step (S51). Here, similarly to step S27, determination is based on the storage method that is set in the storage method selection section 31 (whether to store image data that has been subjected to development processing or to store RAW data).

If the result of determination in step S51 is that the image data storage method is RAW data, sensitivity factor of the image sensor 4 is read out (S53). Here, RGB sensitivity factors for the image sensor 4, that are stored in the sensitivity factor storage section 83a of the flash memory 83, are read out.

Next pixel threshold values for each color are calculated (S55). Here, pixel threshold values of the R pixels and B pixels are calculated using the RGB sensitivity factors that were read out in step S53, with respect to threshold value corresponding to G pixels that was calculated in step S45 or threshold value corresponding to G pixels that was selected in step S49.

On the other hand, if the result of determination in step S51 is that the image data storage method is developed data, white balance is determined from a first image (reference image) (S57). Here, the white balance determination circuit 47 determines white balance corresponding to the reference image data.

Next pixel threshold values for each color are calculated (S59). Here, pixel threshold values of the R pixels and B pixels are calculated using the white balance that was acquired in step S57, with respect to threshold value corresponding to G pixels that was calculated in step S45 or threshold value corresponding to G pixels that was selected in step S49.

If the pixel threshold values for each color have been calculated in step S55 or S59, next pixel threshold values are set (S61). Here the pixel threshold setting section 27 determines and stores pixel threshold values corresponding to each of the RGB pixels. The pixel threshold values that have been stored are used at the time of comparison in the pixel level comparison section 21 (refer to S15 in FIG. 4). Once pixel threshold value setting has been carried out, the originating flow is returned to.

In this way, with the first embodiment of the present invention, there is the pixel level comparison section 21 that determines whether or not levels of respective pixel data constituting image data that has been generated by the imaging section are greater than or equal to a given threshold level, and the selection control section 33 carries out control in order to select whether to carry out adding and averaging using the adding and averaging combination circuit 39 or to carry out comparatively bright combination using the comparatively bright combination circuit 41, on the respective pixel data constituting the image data that has been generated by the imaging section, in accordance with the determination result of the pixel level comparison section 21 (refer to S15, S17 and S19 in FIG. 4).

Since adding and averaging and comparatively bright combination are selectively applied in accordance with whether a brightness that has been set at a pixel threshold has been exceeded or has not been exceeded, random noise is suppressed and it is possible to clearly retain trials of light beams.

In particular, since adding and averaging combination processing is applied to dark pixels that do not exceed the pixel threshold that has been set, these pixels will be buried in the background every time combination is repeated, and become less prominent. Also, since comparatively bright combination processing is applied to bright pixels that have exceeded the pixel threshold it is possible to photograph trails.

Also, with this embodiment, color filters are arranged on the imaging surface of the image sensor, and threshold levels are set independently for each color of the color filters. This means that in the case of cumulative combination processing it is possible to prevent a tint occurring in the combined image. It should be noted that in a case where light is divided for each wavelength and a plurality of image sensors are arranged, as shown in FIG. 3, threshold levels may be independently set for each color that is read out from the imaging section.

Also, with this embodiment, in a case where image data that has been generated by the imaging section is RAW image data, threshold levels are independently set in accordance with sensitivity factors of each color that has been read out from the imaging section (refer to S51, S53 and S55 in FIG. 5). This means that even when a storage method is RAW image data, in the event that cumulative combination processing has been applied it is possible to prevent a tint arising in the combined image.

Also, with this embodiment, in the event that image data that has been generated by the imaging section is image data that has been subjected to white balance processing, threshold levels are independently set for each color that has been read out from the FIG. 5 in accordance with white balance (refer to S51, S57 and S59 in FIG. 5). This means that even when a storage method is developed data, in the event that cumulative combination processing has been applied it is possible to prevent a tint arising in the combined image.

Next, a second embodiment of the present invention will be described using FIG. 9 and FIG. 10. In the first embodiment, combination processing was carried out for the purpose of suppressing random noise in dark sections. Conversely, with the second embodiment, for pixels that are brighter that a level that has been set in the pixel threshold setting section also, fluctuation in a fixed range is determined as random noise and adding and averaging processing is applied. In this way it becomes possible to provide a combined image that also has less random noise in bright portions.

The electrical structure of the second embodiment is the same as that in FIG. 1A and FIG. 1B, and so detailed description will be omitted. Also, operation of this embodiment may be understood by replacing the flowcharts shown in FIG. 4 and FIG. 5 relating to the first embodiment with the flowcharts shown in FIG. 9 and FIG. 10.

It should be noted that in the second embodiment the pixel difference comparison section 23 functions as a pixel difference comparison section for comparing, among each of the pixel data respectively constituting first image data that has been generated by the imaging section and second image data generated immediately before the first image data, differences in pixel data for the same pixel address.

Figure 9:
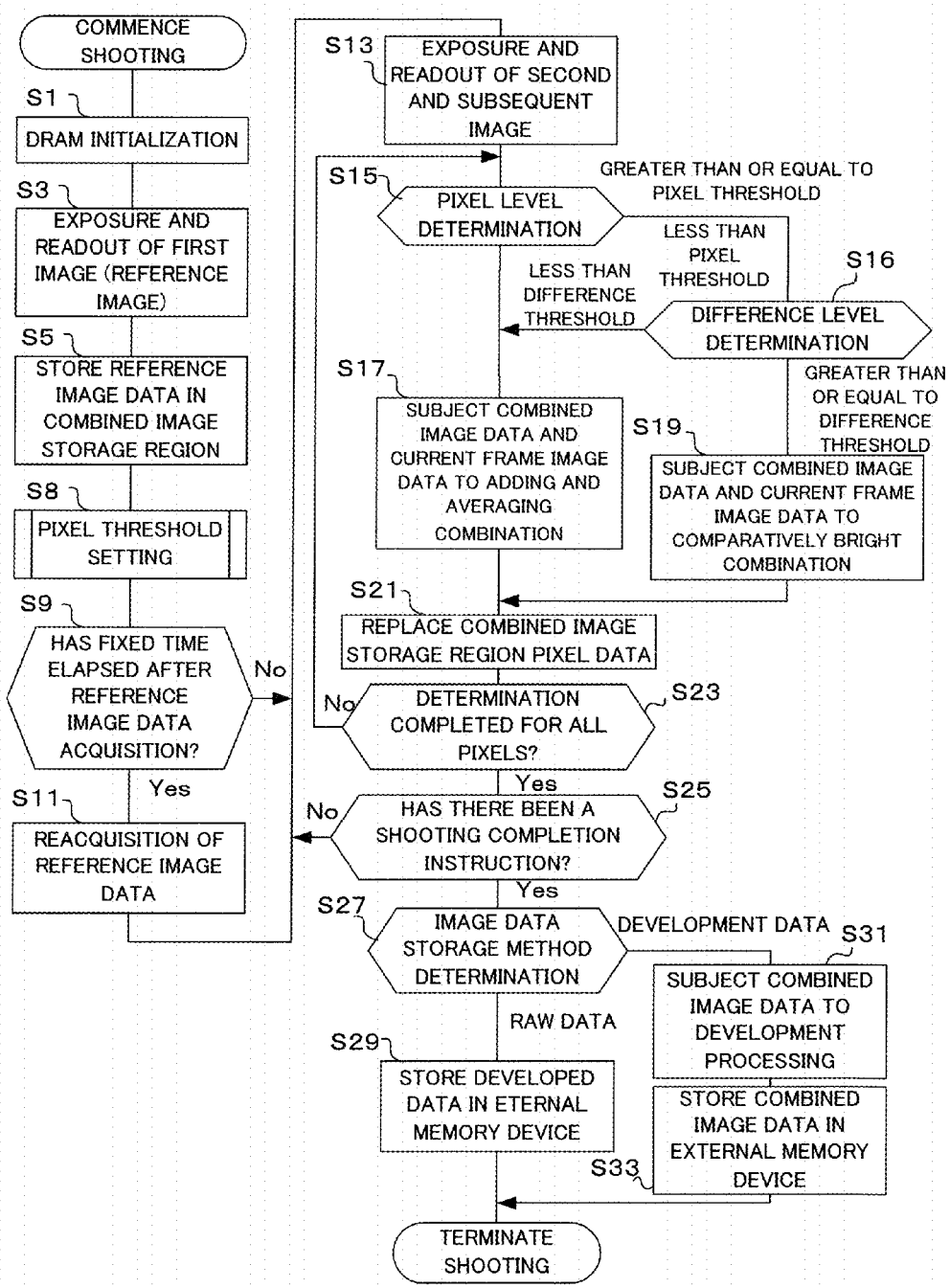
FIG. 9 is a flowchart showing shooting operation of a camera of a second embodiment of the present invention.
Figure 10:
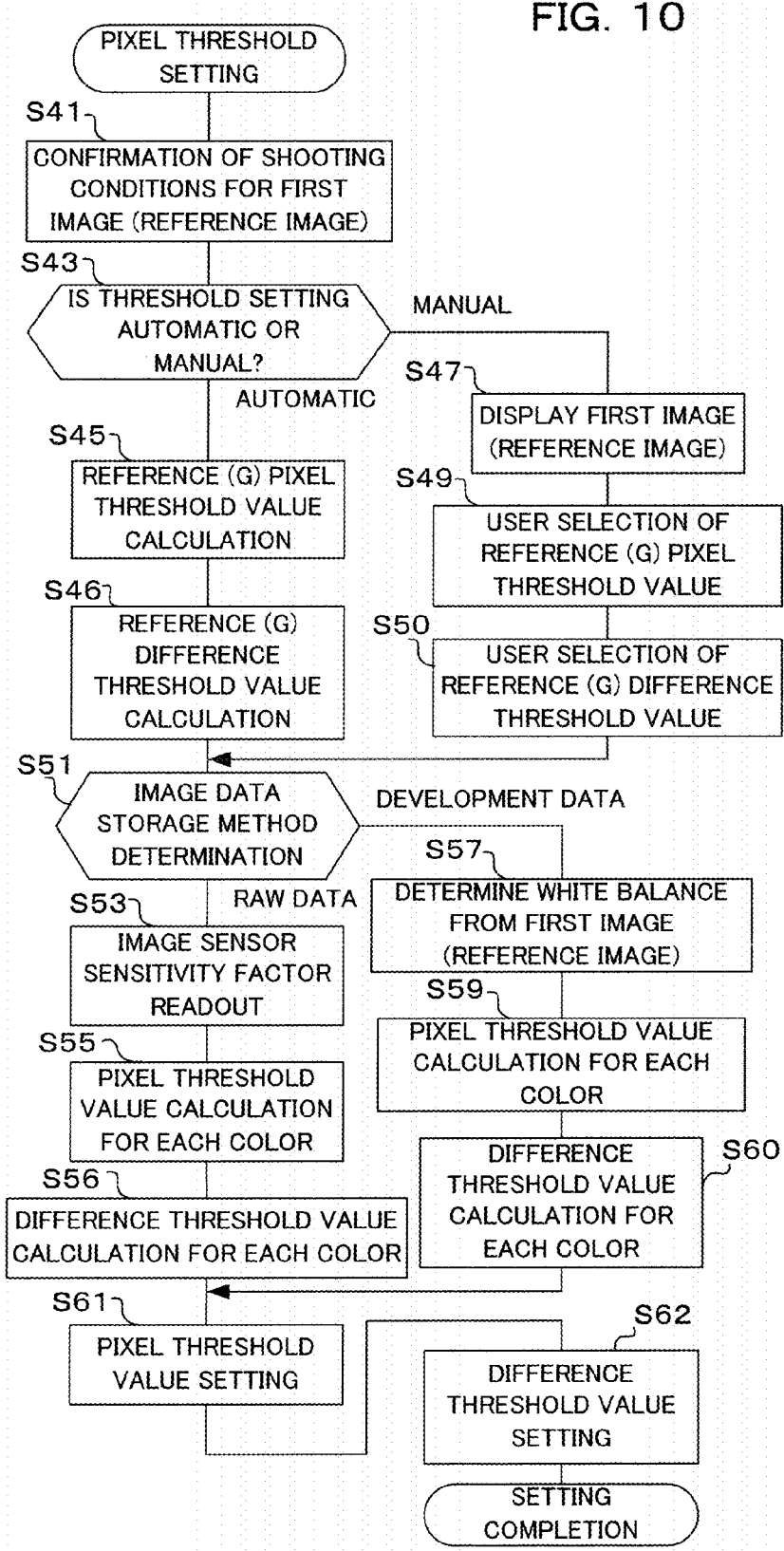
FIG. 10 is a flowchart showing operation for pixel threshold setting of the camera of the second embodiment of the present invention.

Also, the selection control section 33 functions as a selection control section for carrying out control such that when a level of each of the pixel data constituting first image data is greater than or equal to a given threshold level, and a result of comparison by the pixel difference comparison section 23 is that a difference value for pixel data of the same pixel address is greater than or equal to a given absolute value, comparatively bright combination is carried out on each of the pixel data constituting image data that has been generated by the imaging section (refer to S15 and S17 in FIG. 9), and carrying out control such that when the level of each of the pixel data constituting image data that has been subjected to adding and averaging by the adding and averaging combination section is greater than or equal to a given threshold level, and the result of comparison by the pixel difference comparison section 23 is that an absolute value of a difference value between pixel data of the same pixel address is smaller than a given value, adding and averaging combination is carried out on each of the pixel data constituting image data that has been generated by the imaging section (refer to S15, S16 and S19 in FIG. 9).

The flowchart shown in FIG. 9, is the same as the flowchart shown in FIG. 4, apart from the fact that the pixel threshold setting of step S7 is replaced with the pixel threshold setting of step S8, and step S16 has been added. Description will therefore center on points of difference, and description has been simplified by assigning the same step numbers to the same processes.

In a state where a cumulative image combination mode has been set, if shooting is commenced, then similarly to the first embodiment DRAM initialization is carried out (S1), followed by exposure and readout of a first image (reference image) (S3), and then reference image data is stored in the combined image storage region (S5).

If storage of reference image data has been carried out, next pixel threshold setting is carried out (S8). Regarding pixel threshold setting, in the first embodiment it was determined whether or not a pixel level of a read-out image had exceeded a pixel threshold (pixel level determination). In the second embodiment, in addition to the pixel level determination, difference level determination is carried out, and so the threshold for this difference level determination (difference threshold) is also set. The difference threshold is used when determining whether to carry out comparatively bright combination or to carry out adding and averaging combination in accordance with difference between pixel level of a currently acquired image and pixel level of a combined image (refer to S16). Detailed operation of the pixel threshold setting will be described later using FIG. 10.

If pixel threshold setting has been carried out, then similarly to the first embodiment, the processing of steps S9, S11 and S13 is executed. If exposure and readout of a second or subsequent image has been carried out in step S13, pixel level determination is carried out (S15). The result of this determination is transmitted to the selection control section 33 as a pixel threshold comparison result flag.

If the result of determination in step S15 is that the pixel level is greater than or equal to the pixel threshold, difference level determination is carried out (S16). In the difference level determination of step S16, it is determined whether or not a difference value between pixel data corresponding to two sets of image data (pixel data for the same address), namely combined image data formed by cumulative combination up to the immediately previous frame and image data that has been read out this time, exceeds the difference threshold. For the purpose of this determination, the difference threshold for difference level determination is set in the difference threshold setting section 29. Also, the pixel difference comparison section 23 carries out difference level determination by comparing a difference value, for every pixel, between a combined image that has been stored in the combined image storage region 85a and image data that has been read out this time from the image sensor 4, with a difference threshold. The result of this difference level determination is transmitted to the selection control section 33 as a difference threshold comparison result flag.

If the result of difference level determination in step S16 is that greater than or equal to the difference threshold has been determined combined image data and image data of the current frame are subjected to comparatively bright combination (S19), while if the result of determination in step S16 is that less than the difference threshold has been determined, and the result of determination in step S15 was that less than the pixel threshold was determined, the combined image data and image data of the current frame are subjected to adding and averaging combination (S17).

Specifically, a combination method to be carried out by the image synthesis circuit 37 is selected by the selection control section 33 based on the transmitted pixel threshold comparison result flag and difference threshold comparison result flag. At the time the pixel threshold comparison result flag has been set to indicate that the pixel threshold value has not been exceeded (less than the pixel threshold in S15), the adding and averaging combination processing section 39 within the image synthesis circuit 37 is selected so as to carry out adding and averaging combination processing with pixel data of the same address in the combined image data.

Also, in the selection control section 33, when the flag has been set to indicate that the pixel threshold value has been exceeded (equal to or greater than pixel threshold in S15), the difference threshold comparison result flag is checked, and when it has been determined that the difference threshold comparison result flag indicates that the difference threshold has not been exceeded (less than difference threshold in S16) the adding and averaging combination processing circuit 39 within the image synthesis circuit 37 is selected so as to carry out adding and averaging combination, while when it is determined that the difference threshold has been exceeded (greater than or equal to difference threshold in S16) the comparatively bright combination processing circuit 41 within the image synthesis circuit 37 is selected so as to carry out comparatively bright combination processing. With the image synthesis circuit 37 combination processing is executed in conformity with a combination method that has been selected by the selection control section 33.

If combination processing has been selected in step S17 or S19, the same processing as for the first embodiment is executed. The following processing is the same as that for the first embodiment and so detailed description is omitted.

Next, detailed operation of the pixel threshold setting in step S8 will be described using the flowchart shown in FIG. 10. Compared to the flowchart shown in FIG. 5, the flowchart shown in FIG. 10 differs only in that steps S46, S50, S56, S60 and S62 have been added, and so description will focus on this point of difference.

If the flow for pixel threshold setting has been entered, first shooting conditions for a first image (reference image) are confirmed (S41), and it is determined whether threshold setting is automatic or manual (S43). If the result of this determination is that threshold setting is automatic, then a threshold value for reference (G) pixels is calculated (S45), and a reference (G) difference threshold value is calculated (S46).

The difference threshold value in step S46 is calculated by the difference threshold setting section 29 within the threshold setting section 25. This difference threshold value may also be set based on shooting conditions of the reference image, as in the case of the pixel threshold value.

Also, if the result of determination in step S43 is that threshold setting is manual, the user selects a reference (G) pixel threshold value (S49), and the user selects a reference (G) difference threshold value (S50). Regarding the difference threshold value in the case of manual, the user selects two subjects from within the reference image, such as shown in FIG. 6 and FIG. 7, and setting of the difference threshold value is performed based on difference data between G pixels the two selected positions.

If a difference threshold value has been calculated or selected in step S46 or S50, then in step S51 and after calculation of pixel threshold value and difference threshold is carried out for each color. The difference threshold value also, similarly to the pixel threshold value, imparts a tint to an image after development if a threshold value is not changed for each color.

Therefore, a difference threshold value for each color may be stored in the flash memory 83, or only a reference difference threshold value may be stored, and a difference threshold value for each color calculated taking into consideration sensitivity factors of the image sensor and white balance gain at the time of development, similarly to when calculating pixel threshold value.

If the result of determination in step S51 is that the image data storage method is RAW data, image sensor sensitivity factors are read out (S53), a pixel threshold value for each color is calculated (S55), and a difference threshold value for each color is calculated (S56). On the other hand, in a case where the image data storage method is developed data, white balance is determined from the first image (reference image) (S57), a pixel threshold value for each color is calculated (S59), and a difference threshold value for each color is calculated (S60).

If a difference threshold value for each color has been calculated in steps S56 and S60, then pixel threshold values are set (S61), and difference threshold values are set (S62). Here, the difference threshold setting section 29 sets difference threshold value for G pixels in steps S46 and S50, and sets difference thresholds values for R pixels and B pixels in steps S56 and S60, and in this way all of the difference thresholds are set. Once the difference threshold values have been set, the originating flow is returned to.

In this way, with the second embodiment of the present invention, in addition to the pixel threshold values difference threshold values also set (refer to S46, S50, S56 and S60 in FIG. 10), and by comparing these threshold values and pixel data (including difference values) (refer to S16 in FIG. 9), either comparatively bright combination or adding and averaging combination is selected. With the first embodiment even if differences between respective pixel data for the combined image data and the image data acquired this time are small, in the case of being greater than or equal to the pixel threshold comparatively bright combination processing was carried out, and there may be cases where noise is noticeable. However, with the second embodiment, by carrying out difference threshold determination adding and averaging combination is carried out in a case where difference between respective pixels is small, which means the noise becomes less prominent.

Next, a combined image created with the first and second embodiments will be described using FIG. 11 and FIG. 12. Images P11, P12 and P13 in the upper row of FIG. 11 are images that have been taken by single exposure every time. In the middle row of FIG. 11, are images resulting from combination of the images P11, P12 and P13 in the upper row of FIG. 11 using comparatively bright combination. In the lower row of FIG. 11 are images resulting from combination of the images P11, P12 and P13 using adding and averaging combination.

The upper row in FIG. 12 shows images resulting from combination of the images P11, P12 and P13 using the pixel thresholds shown in the first embodiment. The middle row in FIG. 12 shows images resulting from combination of the images P11, P12 and P13 using the pixel thresholds and difference thresholds shown in the second embodiment. The lower image in FIG. 12 shows noise levels and thresholds within an image.

First, noise levels within the image will be described using the lower image in FIG. 12. Image P6 is the same as the first taken image P11. Pixel position 100 is on the wall of a house, and the brightness here is set as the pixel threshold level. Random noise that is of a lower level than the pixel threshold arises at pixel position 96. This random noise is eliminated from the combined image after repeating averaging combination. Random noise that is of a higher level than the pixel threshold and a higher level than an upper difference threshold arises at pixel position 97. Noise of this level constitutes a target in comparatively bright combination, and remains in the combined image.

Random noise that is of a higher level than the pixel threshold and a lower level than an upper difference threshold arises at pixel position 98. Noise of this level constitutes a target in the comparatively bright combination of the first embodiment, and constitutes a target in the adding and averaging combination of the second embodiment. At pixel position 99, random noise that is of a lower level than the pixel threshold arises in the first taken image P11, but random noise that is of a higher level than the pixel threshold and a higher level than a lower difference threshold arises in the second taken image P12. Noise of this level constitutes a target in the comparatively bright combination of the first embodiment, and constitutes a target in the adding and averaging combination of the second embodiment.

The middle row in FIG. 11 shows change over time in a combined image in the case of comparatively bright combination, as was described previously. Image P21 is the same as image P11, image P22 is an image resulting from subjecting image P11 and image P12 to comparatively bright combination, and image P23 is an image resulting from subjecting image P22 and image P13 to comparatively bright combination. As will be understood from the combined image assigned symbol A within image P23, by carrying out comparatively bright combination trails of light beams remain but random noise also remains.

The lower row in FIG. 11 shows change over time in a combined image in the case of adding and averaging combination, as was described previously. Image P31 is the same as image P11, image P32 is an image resulting from subjecting image P11 and image P12 to adding and averaging combination, and image P33 is an image resulting from subjecting image P32 and image P13 to adding and averaging combination. As will be understood from the combined image assigned symbol B in image P33, by carrying out adding and averaging combination random noise fades away while trails of light beams also gradually fade.

The upper row in FIG. 12 shows change over time in a combined image, in a case of applying the first embodiment of the present invention, as described previously. Brightness of the pixel threshold is shown on the left side of the upper row of FIG. 12. With this example, pixel data and the pixel threshold are compared for every pixel level, either adding and averaging combination or comparatively bright combination is selected, and processing is executed. As will be understood from the combined images assigned symbols C and D within image P43, random noise of greater than or equal to a fixed brightness remains with no loss because of comparatively bright combination (refer to pixel positions 97, 98 and 99 in the lower row of FIG. 12).

The middle row in FIG. 12 shows change over time in a combined image, in a case of applying the second embodiment of the present invention, as described previously. Brightness of the pixel threshold, brightness of the upper difference threshold and brightness of the lower difference threshold are shown to the left of the middle row in FIG. 12. With this example, pixel threshold and difference threshold are compared for every pixel level, either adding and averaging combination or comparatively bright combination is selected, and processing is executed. Even when there is random noise of a fixed brightness or greater, in the event that this random noise is smaller than the difference threshold adding and averaging combination is carried out, which means that a lot of the random noise disappears (refer to pixel positions 97, 98 and 99 in the lower row of FIG. 12). However, random noise of an extremely high level does not disappear.

As has been described above, with each of the embodiments of the present invention, a subject image is formed and image data is generated (for example, S3 and S13 in FIG. 4), image data is stored (for example S5 and S21 in FIG. 4), image data generated by the imaging and stored image data are subjected to adding and averaging for every pixel and image data that has been subjected to adding and averaging, within the stored image data, is updated (for example, S17 and S21 in FIG. 4), image data generated by the imaging and stored image data are subjected to comparatively bright combination for every pixel and image data that has been subjected to comparatively bright combination, within the stored image data, is updated (for example, S19 and S21 in FIG. 4), it is determined whether or not level of respective pixel data constituting the image data generated by the imaging is greater than or equal to a given threshold level (for example, S15 in FIG. 4), and in accordance with the result of this determination control is carried out in order to select whether to carry out adding and averaging or to carry out comparatively bright combination on the respective pixel data constituting the image data that has been generated as a result of imaging (for example, S15, S17 and S19 in FIG. 4).

As a result, random noise is further suppressed when acquiring combined image data by combining a plurality of image data in accordance with brightness, and it is possible to clearly retain trails of light beams. Specifically, since carrying out adding and averaging or carrying out comparatively bright combination is selected in accordance with whether or not a level of each pixel data is greater than or equal to a given threshold level, it is possible to select the most appropriate image processing in accordance with individual brightness, and it is possible to suppress random noise.

It should be noted that with each of the embodiments of the present invention, the comparatively bright combination processing or the adding and averaging combination processing among the cumulative combination processing is selected in accordance with the determination results for pixel level, namely whether a pixel is higher or lower than a threshold. However, this is not limiting, and as the cumulative combination processing other combination processing may be used, such as additive combination processing, or comparatively dark combination processing. The additive combination processing involves adding pixel data for every pixel respectively corresponding to two sets of image data, and then replacing pixel data with the result of this calculation (addition value). Also, comparatively dark combination processing involves comparing pixel data for every pixel respectively corresponding to two sets of image data, and replacing with the darker pixel data. In this case, as the cumulative combination processing, if one of comparatively bright combination processing, comparatively dark combination processing or one among other combination processing is made first cumulative combination processing, and adding and averaging processing, addition processing or other processing is made second cumulative combination processing, pixel level determination and/or difference level determination are carried out and either of the cumulative combination processing approaches maybe selected. Also, three or more types of cumulative combination processing may be provided, and selection made from within these types of cumulative combination processing.

Also, with each of the embodiments of the present invention, in the case of carrying out comparatively bright combination processing or comparatively dark combination processing, either bright pixel values or dark pixel values are replaced. However, this is not limiting, and weighting of bright pixels and dark pixels may also be carried out. For example, in the case of comparatively bright combination processing, new pixel values may be calculated by applying a weighting of 8 to bright pixel values and applying a weighting of 2 to dark pixel values. For example, when cumulative combination processing is being carried out, in a case where an image is blurred, if weighting of an image that is not blurred is made large and weighting of an image that is blurred is made small, the effects of image blurring can be made small.

Similarly, in the case of carrying out adding and averaging combination processing or additive combination processing also, adding and averaging or addition may be carried out by applying weighting to respective pixels of image data that has been combined and image data that has been acquired this time. In this case also, in accordance with image blur, if weighting is adjusted when carrying out adding and averaging or addition, it is possible to make the effect of image blur small.

Also, in each of the embodiments of the present invention, the ranging and photometry circuit 17, pixel comparison section 19, threshold setting section 25, storage method selection section 31, selection control section 33, image processing circuit 35 etc. are constructed separately from the system controller 11, but some or all of these sections may be constituted by software, and executed by a CPU within the controller 1. Also, besides being implemented by hardware circuits and single components, the signal processing circuit 13, imaging control circuit 14, display control circuit 51, I/F control circuit 53, memory card control circuit 55, input control circuit 57, image synthesis circuit 37, developing processing circuit 45 etc. may be configured in software using a CPU and programs, and may also utilize a DSP (Digital Signal Processor). Suitable combinations of these approaches may also be used. Also, the above described signal processing circuit 13 and image synthesis circuit 37 are not limited to hardware circuits or simple components, and may also include circuits implemented using a CPU and software, and circuits implemented using a DSP or the like.

Also, with this embodiment, an imaging device has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal, personal computer (PC), tablet type computer, game console etc. The present invention may be applied to any device for combining a plurality of image data in order to generate an image. The present invention may also be applied to a device that does not have an imaging section, as long as it is a device for carrying out image processing in order to generate an image by combining a plurality of image data.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
   an image sensor that forms a subject image and generates image data;
   an image data memory that stores image data;
   a first combination processing circuit that carries out first cumulative combination processing for every pixel of image data that has been generated by the image sensor and image data that has been stored in the image data memory, and outputs updated pixel data to generate updated stored image data,
   a second combination processing circuit that carries out second cumulative combination processing for every pixel of image data that has been generated by the image sensor and image data that has been stored in the image data memory, and outputs updated pixel data to generate updated stored image data, and
   a controller that compares level of each pixel data constituting image data that has been generated by the image sensor with a given threshold level, and in accordance with the result of comparison selects to either carry out the first cumulative processing by the first combination processing circuit, or to carry out the second cumulative processing by the second combination processing circuit, on each pixel data constituting image data that has been generated by the image sensor.

2. The imaging device of claim 1, wherein:
   one of the first or second combination processing circuits is an adding and averaging combination circuit that performs adding and averaging every pixel on image data that has been generated by the image sensor and image data that has been stored in the image data memory, and updates pixel data that has been subjected to the adding and averaging, among image data that has been stored in the image data memory, and
   the other of the first or second combination processing circuits is a comparatively bright combination circuit that performs comparatively bright combination every pixel on image data that has been generated by the image sensor and image data that has been stored in the image data memory, and updates pixel data that has been subjected to the comparatively bright combination, among image data that has been stored in the image data memory.

3. The imaging device of claim 2, wherein:
   the controller, when it has been determined that level of each pixel data constituting the image data that has been generated by the image sensor is greater than or equal to the given threshold level, performs control so as to carry out the comparatively bright combination on each of the image data generated by the image sensor, and when level of each pixel data constituting the image data that has been generated by the image sensor is lower than the given threshold level, performs control so as to carry out the adding and averaging on each pixel data constituting the image data that has been generated by the image sensor.

4. The imaging device of claim 2, further comprising:
   a pixel difference comparison section that compares, among each of the pixel data respectively constituting first image data that has been generated by the image sensor and second image data generated immediately before the first image data, differences in pixel data for the same pixel address, wherein the controller
   performs control, so as to carry out the comparatively bright combination on each pixel data constituting the image data that has been generated by the image sensor, when level of each pixel data constituting the first image data is greater than or equal to the given threshold level, and a result of comparison by the pixel difference comparison section is that a difference value of pixel data for the same pixel position is greater than or equal to a predetermined absolute value, and
   performs control, so as to carry out the adding and averaging combination on each pixel data constituting the image data that has been generated by the image sensor, when level of each pixel data constituting the image data that has been subjected to adding and averaging by the adding and averaging combination circuit is greater than or equal to the given threshold level, and a result of comparison by the pixel difference comparison section is that an absolute value of a difference value of pixel data for the same pixel position is smaller than a given value.

5. The imaging device of claim 1, wherein:
   color filters are arranged on the imaging surface of the image sensor, and the given threshold level is individually set for each color of the color filters.

6. The imaging device of claim 1, wherein:
   a plurality of the image sensors are arranged capable of dividing light for each wavelength, and the given threshold is independently set for each color that is read out from the image sensors.

7. The imaging device of claim 5, wherein:
   in a case where image data that has been generated by the image sensor is RAW image data, the given threshold level is individually set in accordance with sensitivity factor of each color that is read out from the image sensor.

8. The imaging device of claim 6, wherein:
   in a case where image data that has been generated by the image sensors is RAW image data, the given threshold level is individually set in accordance with sensitivity factor of each color that is read out from the image sensors.

9. The imaging device of claim 5, wherein:
   in a case where image data that has been output from the image sensor is further subjected to white balance processing, the given threshold level is individually set for each color that is read out from the image sensor in accordance with the white balance.

10. The imaging device of claim 6, wherein:
    in a case where image data that has been output from the image sensors is further subjected to white balance processing, the given threshold level is individually set for each color that is read out from the image sensors in accordance with the white balance.

11. The imaging device of claim 1, wherein:
one of the first and second cumulative combination processing is either comparatively bright combination processing or comparatively dark combination processing, and
the other of the first and second cumulative combination processing is either adding and averaging combination processing or addition processing.

12. The imaging device of claim 1, wherein:
the first and second combination processing circuits carryout weighting of each pixel, when carrying out the first or second cumulative combination processing for every pixel on image data that has been generated by the image sensor and image data that has been stored in the image data memory.

13. An imaging method comprising:
forming a subject image using an image sensor
and generating image data,
storing image data,
comparing level of each pixel data constituting image data that has been generated by the image sensor with a given threshold level, and in accordance with the result of comparison selecting to either carry out first cumulative processing or to carry out second cumulative processing, on each pixel data constituting image data that has been generated by the image sensor, wherein
in a case where the first cumulative combination processing has been selected, carrying out first cumulative processing for every pixel of image data that has been generated by the image sensor and image data that has been stored in the image data memory, and outputting updated pixel data to generate updated stored image data, and
in a case where the second cumulative combination processing has been selected, carrying out second cumulative processing for every pixel of image data that has been generated by the image sensor and image data that has been stored in the image data memory, and outputting updated pixel data to generate updated stored image data.

14. The imaging method of claim 13, wherein:
one of the first cumulative combination processing or the second cumulative combination processing performs adding and averaging for every pixel on image data that has been generated in the imaging section and the stored image data, and
the other of the first cumulative combination processing or the second cumulative combination processing performs comparatively bright combination for every pixel on image data that has been generated in the imaging section and the stored image data.

* * * * *